(12) United States Patent
Hosseini et al.

(10) Patent No.: US 12,075,287 B2
(45) Date of Patent: Aug. 27, 2024

(54) USER EQUIPMENT BEHAVIOR WITH SIDELINK PREEMPTION INDICATION

(71) Applicant: QUALCOMM Incorporated, San Diego, CA (US)

(72) Inventors: Seyedkianoush Hosseini, San Diego, CA (US); Peter Gaal, San Diego, CA (US); Wanshi Chen, San Diego, CA (US); Gabi Sarkis, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 17/476,702

(22) Filed: Sep. 16, 2021

(65) Prior Publication Data

US 2022/0095171 A1   Mar. 24, 2022

Related U.S. Application Data

(60) Provisional application No. 63/080,562, filed on Sep. 18, 2020.

(51) Int. Cl.
*H04W 28/26* (2009.01)
*H04L 1/1867* (2023.01)
(Continued)

(52) U.S. Cl.
CPC .......... *H04W 28/26* (2013.01); *H04L 1/1896* (2013.01); *H04W 72/02* (2013.01); *H04W 72/56* (2023.01)

(58) Field of Classification Search
CPC ..... H04W 28/26; H04W 72/02; H04W 72/10; H04L 1/1896
See application file for complete search history.

(56) References Cited

U.S. PATENT DOCUMENTS

2017/0332207 A1* 11/2017 Sheng .................. H04W 76/18
2019/0394786 A1* 12/2019 Parron ................ H04L 27/0006
(Continued)

FOREIGN PATENT DOCUMENTS

WO   WO-2016022849 A1   2/2016

OTHER PUBLICATIONS

Intel Corporation: "Sidelink Control by NR and LTE Uu Interfaces for V2X Use Cases", 3GPP TSG RAN WG1 Ad-Hoc Meeting 1901, 3GPP Draft, R1-1900486 Intel-EV2X_LNUU_NSL, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), pp. 1-11, XP051593399, Retrieved from the Internet: URL: https://www.3gpp.org/ftp/TSG_RAN/WG1_RL1/TSGR1_AH/NR_AH_1901/Docs/R1-1900486.zip, [retrieved on Jan. 20, 2019], Paragraphs [04.2]-[04.3].
(Continued)

*Primary Examiner* — Won Tae C Kim
(74) *Attorney, Agent, or Firm* — Holland & Hart LLP

(57) ABSTRACT

Methods, systems, and devices for wireless communications are described. A first user equipment (UE) may receive control signaling from a base station. The control signaling may comprising an indication of at least one of a set of resources of a sidelink channel available for sidelink communication with a second UE, an indication of a resource allocation mode type for the set of resources, and an indication that the first UE is one of a transmitter or receiver for the set of resources of the sidelink channel. The first UE may receive, from the base station, a sidelink preemption indication indicating that at least a first resource from the set of resources is preempted. The first UE may then communicate a sidelink transmission over the sidelink channel with
(Continued)

the second UE based on the sidelink preemption indication and the control signaling.

30 Claims, 17 Drawing Sheets

(51) Int. Cl.
*H04W 72/02* (2009.01)
*H04W 72/56* (2023.01)

(56) References Cited

U.S. PATENT DOCUMENTS

| | | | |
|---|---|---|---|
| 2020/0314915 A1* | 10/2020 | Lin | H04W 72/10 |
| 2021/0127364 A1* | 4/2021 | Panteleev | H04W 72/02 |
| 2021/0337512 A1* | 10/2021 | Belleschi | H04W 4/40 |
| 2022/0007403 A1* | 1/2022 | Li | H04W 72/20 |
| 2022/0173840 A1* | 6/2022 | Wang | H04L 1/1812 |
| 2022/0224443 A1* | 7/2022 | Lee | H04L 47/11 |
| 2022/0312438 A1* | 9/2022 | Yi | H04W 72/1263 |

OTHER PUBLICATIONS

International Search Report and Written Opinion—PCT/US2021/050816—ISA/EPO—Jan. 10, 2022.

* cited by examiner

USER EQUIPMENT BEHAVIOR WITH SIDELINK PREEMPTION INDICATION

CROSS REFERENCE

The present application for patent claims the benefit of U.S. Provisional Patent Application No. 63/080,562 by HOSSEINI et al., entitled "USER EQUIPMENT BEHAVIOR WITH SIDELINK PREEMPTION INDICATION," filed Sep. 18, 2020, assigned to the assignee hereof, and expressly incorporated by reference herein.

FIELD OF TECHNOLOGY

The following relates to wireless communications, including user equipment (UE) behavior with sidelink preemption indication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems (for example, NR systems), may support both access links and sidelinks for communications between one or more communication devices. Some techniques for feedback in systems supporting both access links and sidelinks for communications, however, may be deficient in some implementations.

SUMMARY

The described techniques relate to improved methods, systems, devices, and apparatuses that support user equipment (UE) behavior with sidelink preemption indication. Generally, the described techniques provide for enhancing reliability in communication links in wireless communications systems. According to one or more aspects of the present disclosure, a sidelink preemption indication may be provided to a UE indicating preemption of at least a first resource from a set of resources of a sidelink channel available for sidelink communication. In some examples, a UE may receive control signaling comprising one or more of an indication of the set of resources, an indication of a resource allocation mode type for the set of resources, and an indication that the UE is one of a transmitter or receiver for the set of resources of the sidelink channel. The UE may receive the sidelink preemption indication after receiving the control signaling. In some examples, the UE may communicate a sidelink transmission over the sidelink channel with the second UE based on the sidelink preemption indication and the control signaling.

A method of wireless communication at a first UE is described. The method may include receiving, from a base station, control signaling comprising an indication of a set of resources of a sidelink channel available for sidelink communication with a second UE, an indication of a resource allocation mode type for the set of resources, and an indication that the first UE is one of a transmitter or a receiver for the set of resources of the sidelink channel, receiving, from the base station, a sidelink preemption indication indicating that at least a first resource from the set of resources is preempted, and communicating a sidelink transmission over the sidelink channel with the second UE based on the sidelink preemption indication and the control signaling.

An apparatus for wireless communication at a first UE is described. The apparatus may include a processor, memory coupled with the processor, and instructions stored in the memory. The instructions may be executable by the processor to cause the apparatus to receive, from a base station, control signaling comprising an indication of a set of resources of a sidelink channel available for sidelink communication with a second UE, an indication of a resource allocation mode type for the set of resources, and an indication that the first UE is one of a transmitter or a receiver for the set of resources of the sidelink channel, receive, from the base station, a sidelink preemption indication indicating that at least a first resource from the set of resources is preempted, and communicate a sidelink transmission over the sidelink channel with the second UE based on the sidelink preemption indication and the control signaling.

Another apparatus for wireless communication at a first UE is described. The apparatus may include means for receiving, from a base station, control signaling comprising an indication of a set of resources of a sidelink channel available for sidelink communication with a second UE, an indication of a resource allocation mode type for the set of resources, and an indication that the first UE is one of a transmitter or a receiver for the set of resources of the sidelink channel, receiving, from the base station, a sidelink preemption indication indicating that at least a first resource from the set of resources is preempted, and communicating a sidelink transmission over the sidelink channel with the second UE based on the sidelink preemption indication and the control signaling.

A non-transitory computer-readable medium storing code for wireless communication at a first UE is described. The code may include instructions executable by a processor to receive, from a base station, control signaling comprising an indication of a set of resources of a sidelink channel available for sidelink communication with a second UE, an indication of a resource allocation mode type for the set of resources, and an indication that the first UE is one of a transmitter or a receiver for the set of resources of the sidelink channel, receive, from the base station, a sidelink preemption indication indicating that at least a first resource from the set of resources is preempted, and communicate a sidelink transmission over the sidelink channel with the second UE based on the sidelink preemption indication and the control signaling.

Some examples of the method, apparatuses, and non-transitory computer-readable medium described herein may further include operations, features, means, or instructions for receiving the sidelink preemption indication that indicates a preemption priority threshold, communicating to the second UE, a first reservation signal to reserve the first resource based on a transmission priority associated with the sidelink transmission satisfying the preemption priority threshold, and communicating to the second UE, the sidelink transmission via the first resource of the sidelink channel based on reserving the first resource.

Some examples of the method, apparatuses, and non-transitory computer-readable medium described herein may further include operations, features, means, or instructions for receiving the sidelink preemption indication that indicates a first zone, communicating to the second UE, a first reservation signal to reserve the first resource based on a second zone of the first UE being different from the first zone, and communicating to the second UE, the sidelink transmission via the first resource of the sidelink channel based on reserving the first resource.

Some examples of the method, apparatuses, and non-transitory computer-readable medium described herein may further include operations, features, means, or instructions for communicating a first reservation signal to reserve a second resource based on the second resource being different from the first resource, and communicating the sidelink transmission via the second resource of the sidelink channel based on reserving the second resource.

Some examples of the method, apparatuses, and non-transitory computer-readable medium described herein may further include operations, features, means, or instructions for receiving the sidelink preemption indication that indicates a target UE identifier, communicating a first reservation signal to reserve the first resource based on a UE identifier of the first UE being different from the target UE identifier, and communicating the sidelink transmission via the first resource of the sidelink channel based on reserving the first resource.

Some examples of the method, apparatuses, and non-transitory computer-readable medium described herein may further include operations, features, means, or instructions for communicating to the second UE, a reservation signal to reserve the first resource and a second resource from the set of resources based on the control signaling, and communicating to the second UE, the sidelink transmission over the second resource of the sidelink channel based on the sidelink preemption indication.

Some examples of the method, apparatuses, and non-transitory computer-readable medium described herein may further include operations, features, means, or instructions for communicating first reservation signals to reserve the first resource and a second resource from the set of resources based on the control signaling, and communicating second reservation signals to reserve a third resource and a fourth resource from the set of resources of the sidelink channel based on the sidelink preemption indication, where communicating the sidelink transmission may be over the third resource and the fourth resource of the sidelink channel.

In some examples of the method, apparatuses, and non-transitory computer-readable medium described herein, the first resource and the second resource may be different than the third resource, the fourth resource, or both. Some examples of the method, apparatuses, and non-transitory computer-readable medium described herein may further include operations, features, means, or instructions for communicating first reservation signals to reserve the first resource and a second resource from the set of resources during a first transmission time interval based on the control signaling, and communicating second reservation signals to reserve the first resource during a second transmission time interval based on the sidelink preemption indication, where the communicating the sidelink transmission may be over the first resource and the second resource during the second transmission time interval.

Some examples of the method, apparatuses, and non-transitory computer-readable medium described herein may further include operations, features, means, or instructions for determining that the first resource satisfies a sensing threshold, determining that the first resource may be available for sidelink communication based on receiving the sidelink preemption indication at least a defined amount of time prior to the first resource, and communicating the sidelink transmission via the first resource of the sidelink channel based on the first resource being available.

Some examples of the method, apparatuses, and non-transitory computer-readable medium described herein may further include operations, features, means, or instructions for performing a sensing operation to identify that the first resource satisfies a sensing threshold, processing the sidelink preemption indication to determine that the first resource may be unavailable for sidelink communication based on receiving the sidelink preemption indication at least a defined amount of time prior to the first resource, and communicating the sidelink transmission via a second resource of the sidelink channel based on the first resource being unavailable.

Some examples of the method, apparatuses, and non-transitory computer-readable medium described herein may further include operations, features, means, or instructions for performing a sensing operation to identify the first resource satisfies a sensing threshold, processing the sidelink preemption indication to determine that the first resource may be unavailable based on receiving the sidelink preemption indication at least a defined amount of time prior to the first resource, reserving a second resource based on the processing, and communicating the sidelink transmission via the second resource.

Some examples of the method, apparatuses, and non-transitory computer-readable medium described herein may further include operations, features, means, or instructions for performing a sensing operation to identify that the first resource satisfies a sensing threshold, identifying that the first resource may be available for sidelink communication based on the sensing operation, reserving the first resource based on the sidelink preemption indication being received less than a threshold amount of time prior to the first resource, and communicating the sidelink transmission via the first resource of the sidelink channel based on reserving the first resource.

Some examples of the method, apparatuses, and non-transitory computer-readable medium described herein may further include operations, features, means, or instructions for receiving, from the second UE, a negative acknowledgement for the sidelink transmission on a sidelink feedback channel based on the sidelink preemption indication. In some examples of the method, apparatuses, and non-transitory computer-readable medium described herein, the sidelink preemption indication indicates at least one of a priority, a power threshold, a zone identifier, a resource pool identifier, a preemption periodicity, a cast type, or a combination thereof.

In some examples of the method, apparatuses, and non-transitory computer-readable medium described herein, the resource allocation mode type for the set of resources includes a mode 1 resource allocation type or a mode 2 resource allocation type. In some examples of the method, apparatuses, and non-transitory computer-readable medium described herein, the set of resources of the sidelink channel includes at least one of a periodic set of resources, a semi-static set of resources, an aperiodic set of resources, or a combination thereof.

A method of wireless communication at a base station is described. The method may include transmitting, to a first UE, control signaling comprising an indication of a set of resources of a sidelink channel available for sidelink communication with a second UE, an indication of a resource allocation mode type for the set of resources, and an indication that the first UE is one of a transmitter or a receiver for the set of resources of the sidelink channel, determining to preempt a first resource from the set of resources, and transmitting, to the first UE, a sidelink preemption indication indicating the first resource is preempted.

An apparatus for wireless communication at a base station is described. The apparatus may include a processor, memory coupled with the processor, and instructions stored in the memory. The instructions may be executable by the processor to cause the apparatus to transmit, to a first UE, control signaling comprising an indication of a set of resources of a sidelink channel available for sidelink communication with a second UE, an indication of a resource allocation mode type for the set of resources, and an indication that the first UE is one of a transmitter or a receiver for the set of resources of the sidelink channel, determine to preempt a first resource from the set of resources, and transmit, to the first UE, a sidelink preemption indication indicating the first resource is preempted.

Another apparatus for wireless communication at a base station is described. The apparatus may include means for transmitting, to a first UE, control signaling comprising an indication of a set of resources of a sidelink channel available for sidelink communication with a second UE, an indication of a resource allocation mode type for the set of resources, and an indication that the first UE is one of a transmitter or a receiver for the set of resources of the sidelink channel, determining to preempt a first resource from the set of resources, and transmitting, to the first UE, a sidelink preemption indication indicating the first resource is preempted.

A non-transitory computer-readable medium storing code for wireless communication at a base station is described. The code may include instructions executable by a processor to transmit, to a first UE, control signaling comprising an indication of a set of resources of a sidelink channel available for sidelink communication with a second UE, an indication of a resource allocation mode type for the set of resources, and an indication that the first UE is one of a transmitter or a receiver for the set of resources of the sidelink channel, determine to preempt a first resource from the set of resources, and transmit, to the first UE, a sidelink preemption indication indicating the first resource is preempted.

In some examples of the method, apparatuses, and non-transitory computer-readable medium described herein, transmitting the sidelink preemption indication may include operations, features, means, or instructions for transmitting the sidelink preemption indication that indicates a preemption priority threshold. Some examples of the method, apparatuses, and non-transitory computer-readable medium described herein may further include operations, features, means, or instructions for transmitting the sidelink preemption indication that indicates a zone identifier.

Some examples of the method, apparatuses, and non-transitory computer-readable medium described herein may further include operations, features, means, or instructions for transmitting the sidelink preemption indication that indicates a power threshold. Some examples of the method, apparatuses, and non-transitory computer-readable medium described herein may further include operations, features, means, or instructions for transmitting the sidelink preemption indication that indicates a preemption periodicity.

Some examples of the method, apparatuses, and non-transitory computer-readable medium described herein may further include operations, features, means, or instructions for transmitting the sidelink preemption indication that indicates a resource pool identifier. Some examples of the method, apparatuses, and non-transitory computer-readable medium described herein may further include operations, features, means, or instructions for transmitting the sidelink preemption indication that indicates a cast type.

In some examples of the method, apparatuses, and non-transitory computer-readable medium described herein, the resource allocation mode type for the set of resources includes a mode 1 resource allocation type or a mode 2 resource allocation type. In some examples of the method, apparatuses, and non-transitory computer-readable medium described herein, the set of resources of the sidelink channel includes at least one of a periodic set of resources, a semi-static set of resources, an aperiodic set of resources, or a combination thereof.

DETAILED DESCRIPTION

Figure 1:
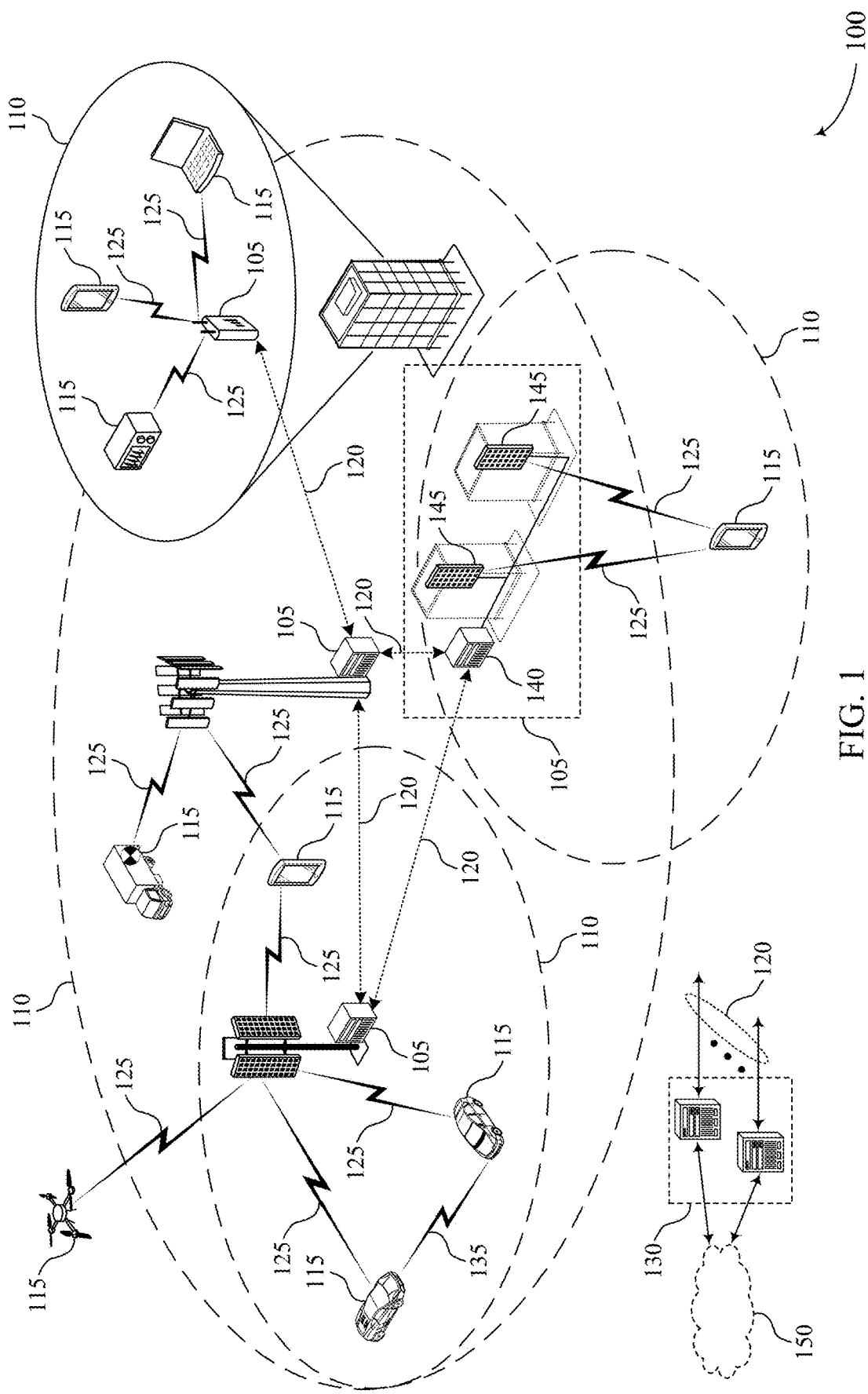
FIG. 1 illustrates an example of a wireless communications system in accordance with aspects of the present disclosure.

A wireless communications system may support both access links and sidelinks for communications between one or more communication devices. An access link may refer to a communication link between a user equipment (UE) and a base station. For example, an access link may support uplink signaling, downlink signaling, connection procedures, etc. A sidelink may refer to any communication link between similar wireless devices (e.g., a communication link between UEs, or a backhaul communication link between base stations). It is noted that while various examples provided herein are discussed for UE sidelink devices, such sidelink techniques may be used for any type of wireless devices that uses sidelink communications. For example, a sidelink may support one or more of device-to-device (D2D) communications, vehicle-to-everything (V2X) or vehicle-to-vehicle (V2V) communications, message relaying, discovery signaling, beacon signaling, or other signals transmitted over-the-air from one UE to one or more other UEs.

Sidelink communications may support communications within a group of UEs. For example, sidelink communications may include communications between a UE and other UEs within a coverage area including the group of UEs (e.g., a coverage area provided by a base station, a coverage area outside of the coverage area provided by the base station, or a combination thereof). One or more of the UEs in the group of UEs may initiate sidelink communications with other UEs in the group of UEs. In some examples, base stations may not be involved in sidelink communications because multiple UEs on the sidelink may receive a data transmission from a single UE, or a single UE may receive data transmissions from multiple UEs.

In some examples, V2X communication may support two resource allocation mechanisms. In a first example, resources may be scheduled by a base station (e.g., mode 1), and in a second example, a UE may perform autonomous resource selection (e.g., mode 2). In wireless communications systems supporting sidelink communications, inter-UE coordination may be improved to increase reliability and efficiency. In case of mode 2 operation, a transmitting UE may perform a sensing operation to find occupied and/or available resources to utilize for an upcoming transmission. In some cases, sidelink operations may interfere with other uplink transmissions to a base station. Often times, sidelink and access link communications may use the same carrier resulting in interference (e.g., on a same licensed band). The sidelink UEs may be in-coverage or out-of-coverage, and one sidelink UE may or might not have an uplink connection (e.g., a Uu connection). In some instances, the base station may preempt at least one of the resources allocated for sidelink communication. In such a case, the base station may transmit a sidelink preemption indication to preempt sidelink transmissions that could overlap with transmissions at the base station. There may be a need to define transmitter UE behavior upon receipt of the sidelink preemption indication.

One or more aspects of the present disclosure provide for a transmitter UE to receive a list of available resources from a base station. The transmitter UE may reserve resources from the list of available resources. The reserved resource may be used for sidelink transmissions. In some examples, the transmitter UE may receive a sidelink preemption indication from the base station indicating that one or more of the available resources are being preempted. The sidelink preemption indication may also indicate various parameters to the transmitter UE to help the transmitter UE in determining whether to follow or disregard the sidelink preemption indication. In some examples, if the preempted resources are reserved by the transmitter UE, the transmitter UE may release the resources (e.g., to avoid transmission) upon receiving the sidelink preemption indication. The transmitter UE may reserve other resources upon releasing the preempted resources.

UEs having a capability of sidelink communications may utilize the techniques described herein to experience power saving, such as reduced power consumption and extended battery life while ensuring reliable and efficient communications in the group of UEs. Particular aspects of the subject matter described in this disclosure may be implemented to realize one or more of the following potential advantages. The techniques employed by the described UEs may provide benefits and enhancements to the operation of the UEs. For example, operations performed by the UEs may provide improvements to wireless operations. In some examples, the UEs may support high reliability and low latency communications, among other examples, in accordance with one or more aspects of the present disclosure. The described techniques may thus include features for improvements to power consumption, spectral efficiency, higher data rates and, in some examples, may promote enhanced efficiency for high reliability and low latency operations, among other benefits.

Aspects of the disclosure are initially described in the context of wireless communications systems. Aspects of the disclosure are further described in the context of resource reservation procedures and process flow. Aspects of the disclosure are further illustrated by and described with reference to apparatus diagrams, system diagrams, and flowcharts that relate to UE behavior with sidelink preemption indication.

FIG. 1 illustrates an example of a wireless communications system 100 that supports UE behavior with sidelink preemption indication in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $\Delta f_f$ may represent the maximum supported discrete Fourier transform (DFT)

size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some wireless communications system may support both access links and sidelinks for communications between one or more communication devices. An access link may refer to a communication link between a UE and a base station. A sidelink may refer to any communication link between similar wireless devices (e.g., a communication link between UEs, or a backhaul communication link between base stations). In some examples, some wireless communications systems may support two modes for resource allocation. In a first example (e.g., mode 1), a base station may allocate the resources for the UEs participating in sidelink communications. In a second example (e.g., mode 2), the UEs may perform autonomous resource selection. In some cases, sidelink operations may interfere with other uplink transmissions to a base station. In such cases, the base station may transmit a sidelink preemption indication to preempt sidelink transmissions that could overlap with transmissions at the base station. There may be a need to define UE behavior upon receipt of the sidelink preemption indication.

One or more aspects of the present disclosure provide for a UE 115 to receive a list of available resources from a base station. The UE 115 may receive control signaling including an indication of a set of resources of a sidelink channel available for sidelink communication with a second UE 115. Additionally or alternatively, the UE 115 may receive an indication of a resource allocation mode type for the set of resources and an indication that the UE 115 is one of a transmitter or receiver for the set of resources of the sidelink channel. The UE 115 may reserve resources from the list of available resources for sidelink transmissions. In some examples, the UE 115 may receive a sidelink preemption indication from the base station indicating that one or more of the available resources are being preempted. The sidelink preemption indication may also indicate various parameters to the UE 115 to help the UE 115 in determining whether to follow or disregard the sidelink preemption indication. In some examples, the UE 115 may communicate a sidelink transmission over the sidelink channel with the second UE 115 based on the sidelink preemption indication and the control signaling.

Figure 2:
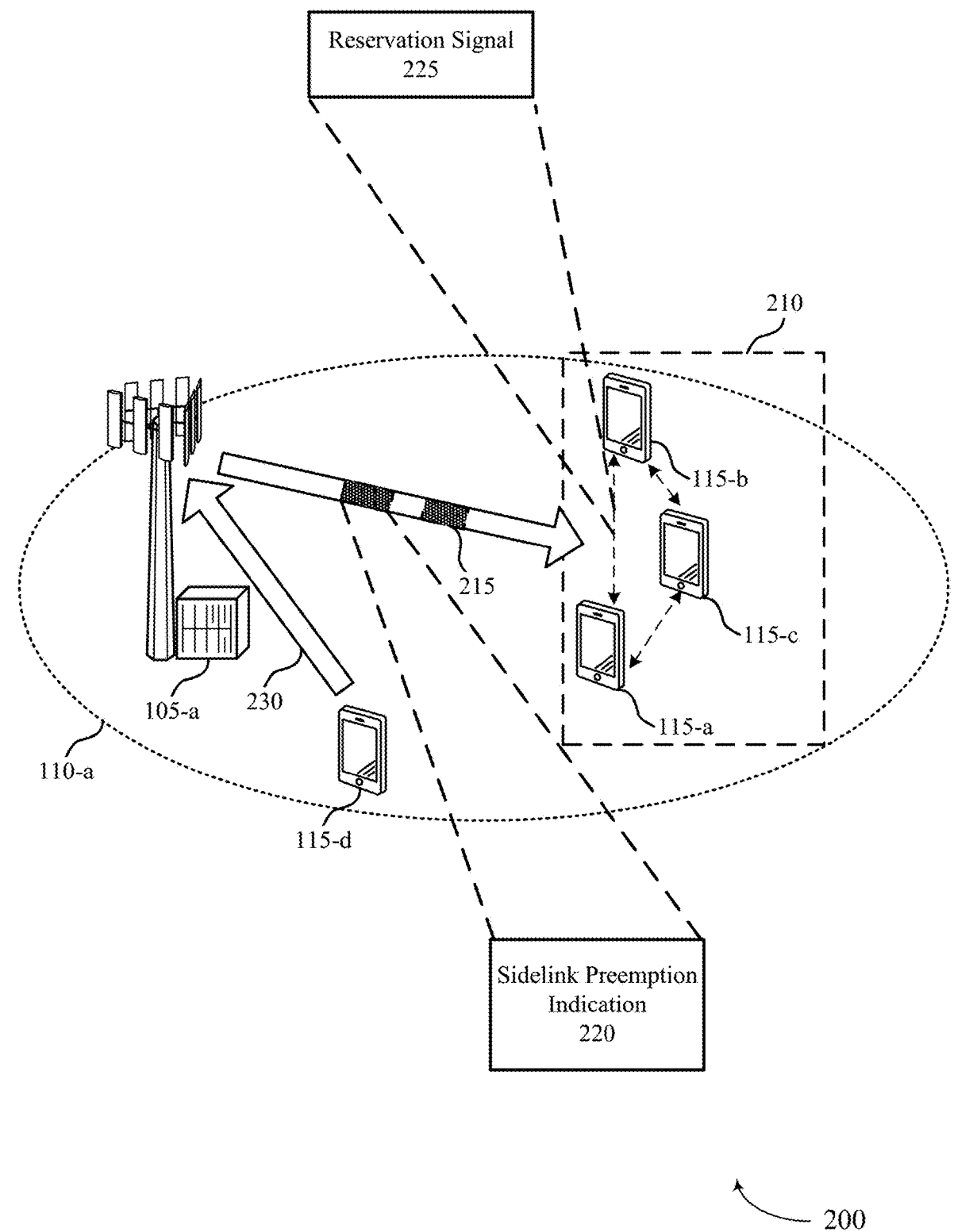
FIG. 2 illustrates an example of a wireless communications system in accordance with aspects of the present disclosure.

FIG. 2 illustrates an example of a wireless communications system 200 that supports UE behavior with sidelink preemption indication in accordance with aspects of the present disclosure. In some examples, the wireless communications system 200 may implement aspects of wireless communications system 100. The wireless communications system 200 includes base station 105-*a*, geographic coverage area 110-*a*, and one or more UEs 115 (may also be referred to as devices). In some cases, the wireless communications system 200 may utilize control signaling to schedule resources for UEs 115 to perform sidelink communications. Additionally or alternatively, the UEs 115 in the wireless communications system 200 may utilize shared information to enhance scheduling, inter-UE coordination, and communications flexibility. In some examples, the group of UEs 115 (e.g., UE 115-*a* (UE 1), UE 115-*b* (UE 2), and UE 115-*c* (UE 3)) may communicate with each other (e.g., within a V2X system, a D2D system, and the like) and may employ sidelink transmissions to save power, reduce latency, and ensure reliable communications. In some examples, vehicles may communicate using V2X resource allocation mode 2 (that utilizes UE autonomous resource selection).

The wireless communications system 200 may support both access links and sidelinks for communications between one or more communication devices. An access link may refer to a communication link between a UE 115 (such as, UE 115-*a* and UE 115-*b*) and a base station 105-*a*. A sidelink may refer to any communication link between similar wireless devices (e.g., a communication link between UEs, or a backhaul communication link between base stations). It is noted that while various examples provided herein are discussed for UE sidelink devices, such sidelink techniques may be used for any type of wireless devices that use sidelink communications. For example, a sidelink may support one or more of D2D communications, V2X or V2V communications, message relaying, discovery signaling, beacon signaling, or other signals transmitted over-the-air from one UE to one or more other UEs.

Base station 105-a may communicate with one or more UEs 115 (e.g., UEs 115-a, 115-b, and 115-c), which may be included within a UE group 210. For example, base station 105-a may transmit control information to UE 115-a, UE 115-b, or UE 115-c. As depicted in the example of FIG. 2, the UE 115-a, the UE 115-b, and the UE 115-c may communicate with each other (or with another group of UEs 115) over sidelink communications (e.g., using a peer-to-peer (P2P) or D2D protocol). In some cases, the UE 115-a may transmit sidelink transmissions to the UE 115-b or the UE 115-c. In some examples, UE 115-a or UE 115-b may monitor resource pools for the sidelink communications or indications of the sidelink communications (e.g., resource reservations, control channel transmissions, among other examples) from other UEs 115 in the group. Additionally or alternatively, the UEs 115 may have data to transmit to (or receive from) one or more of the UEs 115 in the group and may use the sidelink communications to transmit the data transmission. In some examples, the group of UEs 115 may utilize sidelink communications in addition to access links with the base station 105-a.

In some examples, sidelink communications may support communications within a group of UEs 115 (e.g., group 210). For instance, sidelink communications may include communications between a UE (such as, UE 115-a, UE 115-b, and UE 115-c) and other UEs 115 within a coverage area including the group of UEs (e.g., a coverage area provided by a base station, a coverage area outside of the coverage area provided by the base station, or a combination thereof). One or more of the UEs 115 in the group of UEs 115 may initiate sidelink communications with other UEs in the group of UEs. For example, one or more of the UEs 115 may be in a coverage area 110-a (e.g., a coverage area 110 with reference to FIG. 1) of the base station 105-a. In such examples, a UE 115 may communicate with the base station 105-a via a Uu interface (e.g., the base station 105-a may transmit downlink communications to one or more of the UEs 115 via an access link). In some other examples, the group of UEs 115 may not be inside the coverage area or may not communicate with the base station 105-a using an access link.

In some cases, a UE 115 (such as, UE 115-a, UE 115-b, and UE 115-c) may have information (e.g., a detection of an object or obstacle on a road in a V2X system, scheduling information, among other examples) to transmit to the group of UEs 115, and the UE 115 may initiate sidelink communications including the information to the other UEs 115. In such cases, the UE 115 initiating the sidelink communications may be referred to as a transmitting UE and the UE 115 receiving the sidelink communications may be referred to as a receiving UE. In some examples, the base station 105-a may configure sidelink communication resources for the group of UEs using a configuration message (e.g., semi-persistent scheduling configuration message). In one example, the base station 105-a may communicate a control signaling 215 indicating a resource allocation for one or more UEs 115 included in the group of UEs. In some examples, the control signaling 215 may indicate to a transmitter UE, a set of resources of a sidelink channel available for sidelink communication with a receiver UE.

In some wireless communications systems, a UE 115 from the group of UEs may be allowed to select sidelink transmission resources. In some examples, NR V2X communications may support two modes of resource allocation mechanisms: mode 1 (where the resource is scheduled by a base station) and mode 2 (where the UE performs an autonomous resource selection). In case of mode 2 operation, each transmitting UE may perform a sensing operation to find occupied or available resources for transmission. For example, devices (receivers and transmitters) may perform a sensing operation before transmitting.

In some examples, sidelink operations may interfere with uplink transmissions from UE 115-d to a base station 105-a via connection 230 (e.g., Uu communications). Often times, sidelink and Uu communications may use the same carrier on a licensed band where sidelink communications result in Uu interference. Additionally or alternatively, sidelink users (e.g., UEs 115 employing sidelink communication mechanisms) may be within coverage of a base station or may be outside the coverage of the base station. The sidelink users (e.g., UE 115-a, UE 115-b, and UE 115-c) may or may not have a Uu connection with a base station. As described herein, a sidelink device (e.g., transmitter UE or receiver UE) may rely on a base station for resource allocation for sidelink operations. Additionally or alternatively, a sidelink device (e.g., transmitter UE or receiver UE) may perform an autonomous resource allocation for sidelink operations. In some examples, a transmitter UE may use semi-static uplink symbols for sidelink transmissions. In such a case, sidelink transmissions may potentially interfere with Uu uplink communications. Additionally or alternatively, the transmitter UE may use configurable symbols (e.g., X symbols) or symbols allocated for downlink operations (e.g., D symbols) for sidelink transmissions. In such a case, sidelink transmissions may potentially interfere with Uu downlink communications and/or uplink communications. In some instances, the base station 105-a may preempt at least one of the resources allocated for sidelink communication (e.g., due to interference with Uu). In such a case, the base station may transmit a sidelink preemption indication to preempt sidelink transmissions that could overlap with transmissions at the base station. Although some wireless communications provide a sidelink preemption indication, there may be a need to define transmitter UE behavior upon receipt of the sidelink preemption indication from a base station.

One or more aspects of the present disclosure provides for a method defining UE behavior upon receipt of the sidelink preemption indication. The base station 105-a may transmit a sidelink preemption indication 220, which can be used by transmitter UEs (e.g., UE 115-a) to preempt sidelink transmissions that could potentially overlap with Uu transmissions. In particular, the base station 105-a may utilize the sidelink preemption indication 220 to protect high priority Uu transmissions in case the sidelink and Uu transmissions use shared resources. In one example, the base station 105-a may transmit to a first UE (e.g., UE 115-a), a control signaling 215 (or control message) indicating at least one of a set of resources of a sidelink channel is available for sidelink communication with a second UE (e.g., UE 115-b), an indication of a resource allocation mode type for the set of resources, and that the first UE is one of a transmitter or receiver for the set of resources of the sidelink channel.

In some examples, the sidelink preemption indication 220 may indicate time and/or frequency indication of the sidelink resources to be preempted. Additionally or alternatively, sidelink preemption indication 220 may indicate at least one of a priority, a power threshold (e.g., reference signal receive power (RSRP)), a zone identifier, a resource pool identifier, a preemption periodicity, a cast type (e.g., unicast, multicast, broadcast, groupcast), or a combination thereof. One or more aspects of the present disclosure provide for transmitter UE behavior and receiver UE behavior upon receiving sidelink preemption indication 220 while operating under resource allocation mode 1 and resource allocation mode 2 and with periodic and aperiodic reservation.

In wireless communications system 200, a transmitter UE (e.g., UE 115-a) may receive a list (e.g., set) of available resources from the base station 105-a and may reserve resources from the list of available resources (e.g., using reservation signal 225) for sidelink transmissions. In some examples, after identifying the resources, the transmitter UE (e.g., UE 115-a) may receive a sidelink preemption indication 220 from the base station 105-a indicating that one or more of the available resources included in the list are being preempted. The sidelink preemption indication may also indicate various parameters to the transmitter UE (e.g., UE 115-a) to help the transmitter UE in determining whether to follow or ignore the sidelink preemption indication 220. That is, if the transmitter UE (e.g., UE 115-a) determines that the preempted resources indicated by the sidelink preemption indication 220 are not reserved yet (i.e., not signaled to the other UEs), the transmitter UE (e.g., UE 115-a) may choose to disregard the preempted resources from the list of available resources when reserving resources.

In some examples, if the preempted resources are reserved by the transmitter UE (e.g., UE 115-a), the transmitter UE may choose to release the resources (e.g., to avoid transmission) upon receiving the sidelink preemption indication 220. In some examples, the transmitter UE may reserve other resources after releasing the resources indicated by the sidelink preemption indication 220. In some examples, the transmitter UE may ignore the sidelink preemption indication 220 if the sidelink preemption indication 220 indicates a priority threshold for an uplink transmission that is lower than a priority of a sidelink transmission the transmitter UE is scheduled to transmit within the resource indicated for preemption. Thus, the transmitter UE may transmit the higher priority sidelink transmission in a resource indicated to be preempted by the sidelink preemption indication 220. In some instances, the transmitter UE (e.g., UE 115-a) behavior may be dependent on the resource allocation mode (indicated via control signaling 215) and a periodicity of reservation.

In some instances, the transmitter UE (e.g., UE 115-a) may communicate a reservation signal 225 to reserve a first resource and a second resource from the set of resources based on the control signaling 215. The transmitter UE may then communicate the sidelink transmission over the second resource of the sidelink channel based on the sidelink preemption indication 220 preempting the first resource. For instance, the preemption may be applied to reserved resource(s) indicated to be preempted. That is, the transmitter UE may not trigger resource reselection in response to receiving the indication 220. For example, if the transmitter UE has reserved three resources, and the sidelink preemption indication 220 indicates that one of the resources is preempted, then the transmitter UE releases the preempted resource and transmits on the other two remaining resources. In this example, resource selection and preemption may be untied.

In some examples, the transmitter UE (e.g., UE 115-a) may communicate first reservation signals 225 to reserve a first resource and a second resource from the set of resources based on the control signaling 215 (i.e., indicated by the control signaling 215). The transmitter UE may communicate second reservation signals 225 to reserve a third resource and a fourth resource from the set of resources of the sidelink channel based on the sidelink preemption indication 220. In some cases, the transmitter UE communicates the sidelink transmission over the third resource and the fourth resource of the sidelink channel. As described herein, the first resource and the second resource may be different than the third resource, the fourth resource, or both. Thus, according to one or more aspects, the transmitter UE may trigger resource reselection to reserve the other resources even if one resource is preempted. In one example, if the transmitter UE had reserved three resources, and determines that the second resource is indicated to be preempted by the sidelink preemption indication 220, then the transmitter UE may reserve two additional resources for sidelink communications. In another example, if the transmitter UE had reserved three resources, and determines that the second resource is indicated to be preempted by the sidelink preemption indication 220, then the transmitter UE may reserve up to three additional resources for sidelink communications. In some examples, the additional resources (reserved later) may be different from the initially reserved resources.

In some examples, the transmitter UE may communicate first reservation signals 225 to reserve a first resource during a first transmission time interval and a second resource from the set of resources based on the control signaling 215. The transmitter UE may then communicate second reservation signals 225 to reserve the first resource during a second transmission time interval based on the sidelink preemption indication 220. In some cases, the transmitter UE may communicate the sidelink transmission over the first resource during the second transmission time interval. As depicted herein, the transmitter UE may reserve "X" more resources if "X" resources are indicated to be preempted by the sidelink preemption indication 220. For example, if the transmitter UE had reserved three resources, and the second one is indicated to be preempted, then the transmitter UE may reserve one more resource. In one example, the transmitter UE may reserve additional resources by maintaining an initial order. That is, the transmitter UE may reserve one resource in between the first and third resource in the example where the transmitter UE had reserved three resources and the second one is indicated to be preempted. Additionally or alternatively, the transmitter UE may reserve a resource irrespective of the order of the preempted resource.

For mode 2 resource allocation with periodic reservation, the transmitter UE may use any method described herein, applied per period. In other words, the time periods with some resources indicated for preemption may be impacted. For mode 1 resource allocation with dynamic resource allocation, resources may be explicitly indicated by the base station 105-a. In such cases, the indicated resources for preemption may be expected to be impacted. Additionally or alternatively, for mode 1 resource allocation with semi-static resource allocation, the resources that overlap with the resources indicated by the sidelink preemption indication 220 can be preempted.

In some examples, a transmitter UE may determine whether the sidelink preemption indication 220 may be followed or not based on different parameters. The sidelink preemption indication 220 may indicate at least one of a priority, a power threshold, a zone identifier, a resource pool identifier, a preemption periodicity, a cast type, or a combination thereof.

One or more aspects of the present disclosure provides for the transmitter UE (e.g., UE 115-a) to receive the sidelink preemption indication 220 that indicates a preemption priority threshold. The transmitter UE may communicate a first reservation signal 225 to reserve the first resource based on a transmission priority associated with the sidelink transmission satisfying the preemption priority threshold. In some examples, the transmitter UE may communicate the sidelink transmission via the first resource of the sidelink channel based on reserving the first resource. That is, the transmitter UE may receive a preemption priority threshold, reserve resources for sidelink communications, and communicate on overlapping resources if the transmitter UE has a sidelink transmission (e.g., a packet) with a higher priority than the priority threshold. As an example, for mode 2 resource allocation, the transmitter UE may reserve some resources which could be overlapping with the resources indicated by the sidelink preemption indication 220. If the sidelink preemption indication 220 indicates a priority threshold, and the transmitter UE has a packet with a higher priority to transmit on those resources, then the transmitter UE can ignore the sidelink preemption indication 220 and transmit the packet via the preempted resource.

In some examples, the transmitter UE may receive the sidelink preemption indication 220 that indicates a first zone (e.g., corresponding to a particular geographic area). The transmitter UE may communicate a first reservation signal 225 to reserve a first resource based on a second zone of the transmitter UE being different from the first zone (e.g., the transmitter UE is in a different zone than the first zone). The transmitter UE may then communicate the sidelink transmission via the first resource of the sidelink channel based on reserving the first resource. As depicted herein, the first resource may be or include the preempted resource. The transmitter UE thus receives a zone identifier from the base station 105-a, reserves resources for sidelink communications, and communicates on overlapping resources if the transmitter UE is located in a different zone (than what is indicated by the zone identifier). For example, if the transmitter UE (e.g., UE 115-a) receives the sidelink preemption indication 220 applicable to a particular zone identifier, and the transmitter UE is in a different zone, then the transmitter UE can skip the preemption procedure.

Additionally or alternatively, the transmitter UE may communicate a first reservation signal 225 to reserve a second resource based on the second resource being different from a first resource. The transmitter UE may then communicate the sidelink transmission via the first resource of the sidelink channel based on reserving the first resource. In some examples, the transmitter UE may receive a resource pool, reserve resources for sidelink communications, and communicate based on the resource pool.

In some examples, the transmitter UE (e.g., UE 115-a) may receive the sidelink preemption indication 220 that indicates a target UE identifier. The transmitter UE may then communicate a first reservation signal 225 to reserve the first resource based on a UE identifier of the target UE being different from the target UE identifier, and further communicate the sidelink transmission via the first resource of the sidelink channel based on reserving a first resource. According to some examples, the transmitter UE receives a UE identifier, reserves resources for sidelink communications, and communicates on overlapping resources if the UE identifier is intended for a different UE (or different UEs).

In some examples, for mode 1 resource allocation, since the base station 105-a is aware of the resources, time or frequency resources indicated by the sidelink preemption indication 220 may be taken into account by the transmitter UE (regardless of other parameters). In some examples, the sidelink preemption indication 220 may not have UE-specific information, and may be intended for different users (where some users may be operating with mode 1 resource allocation and some other users may be operating with mode 2 resource allocation). In such cases, the transmitter UE may take into account other parameters when reserving resources for sidelink communications.

According to one or more aspects, the transmitter UE may be configured or preconfigured with a path-loss reference. In some examples, if a downlink path-loss reference is configured or both the sidelink and downlink path loss references are configured for determining open-loop power control parameters, the transmitter UE may not monitor for the sidelink preemption indication 220 (as the power control is set to reduce interference at the base station 105-a). Additionally or alternatively, the transmitter UE may monitor the sidelink preemption indication 220, but the set of parameters used to determine whether a transmitter is to be preempted may be different from an example where the sidelink path-loss is configured.

Without any additional indication, a receiver UE may regularly perform sensing since it is not aware whether some resources are preempted or not. If the receiver UE is aware of the preempted resources, then the receiver UE may avoid decoding a physical sidelink shared channel on the preempted resources. For example, if a subchannel "x" on slot "y" is preempted, then the receiver UE may not perform decoding. The receiver UE may also share the preemption information with other UEs via inter-UE coordination. The transmitter UE may receive the preemption information from the receiver UE and may take the information into account when reserving resources for upcoming transmissions. In some examples, if the receiver UE is aware of the preempted transmission resources, then the receiver UE may transmit feedback on a physical sidelink feedback channel (e.g., transmit a negative acknowledgement). Additionally or alternatively, if the receiver UE is aware of the preempted transmission resources, then the receiver UE may refrain from transmitting on the physical sidelink feedback channel.

In some examples, the transmitter UE may receive, from the receiver UE, a negative acknowledgement for the sidelink transmission on a sidelink feedback channel based on a sidelink preemption indication 220. Aspects described herein may be beneficial for a transmitter UE if the transmitter UE misses the sidelink preemption indication 220. Without any feedback received from the receiver UE, the transmitter UE may infer that the control channel was not detected by the receiver UE. Transmitter UE behavior upon reception of sidelink preemption indication 220 may be set by configuration or a pre-configuration on a per-UE or per resource pool or per carrier basis, or any combination thereof. In some examples, the sidelink preemption indication 220 can also be dependent on a cast type (e.g., unicast, multicast, or any other cast type) or priority of packets. Additionally or alternatively, the sidelink preemption indication 220 can also be dependent on reference signal received power. The sidelink preemption indication 220 described according to various aspects of the present disclosure may result in resource savings and enhanced performance of UEs participating in sidelink communications.

Figure 3:
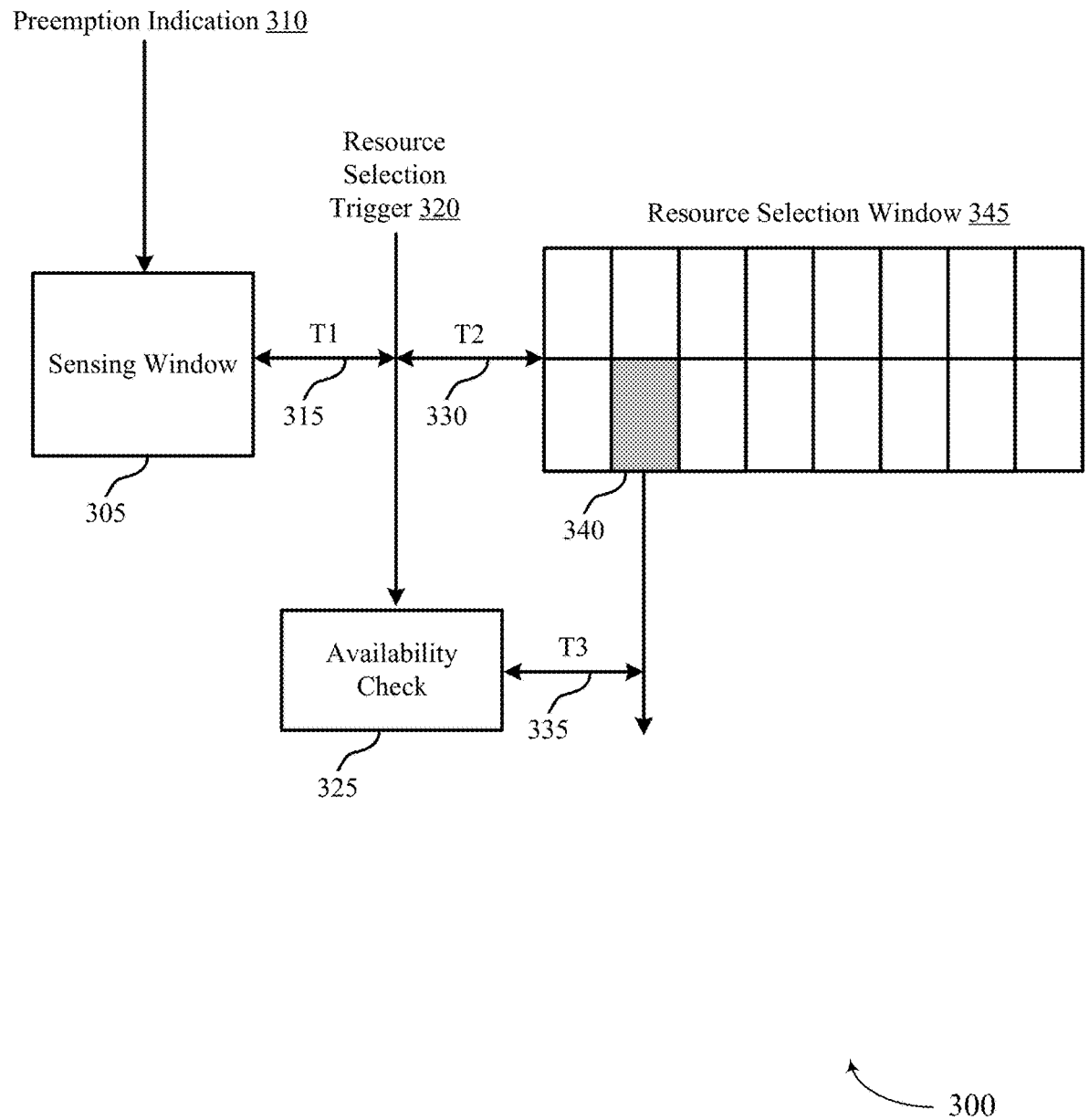
FIG. 3 illustrates an example of a resource reservation procedure in accordance with aspects of the present disclosure.

FIG. 3 illustrates an example of a resource reservation procedure 300 that supports UE behavior with sidelink preemption indication in accordance with aspects of the present disclosure. In some examples, the resource reservation procedure 300 may implement aspects of wireless communications system 100 and the wireless communications system 200 as depicted with reference to FIGS. 1 and 2. In some examples, the resource reservation procedure 300 may be implement by a base station 105 and one or more UEs 115. The base station 105 and the UE 115 may be examples of a base station 105 and a UE 115, as described with reference to FIGS. 1 and 2.

According to one or more aspects of the present disclosure, a first UE 115 may perform sidelink communications with other UEs. In some examples, behavior of the first UE 115 (e.g., a transmitter UE) may depend on the time of a sidelink preemption indication reception. The sidelink preemption indication might be received by a UE at different times as discussed herein. At a given point of time that the sidelink preemption indication is received, if sufficient time is available to perform a given operation, the first UE 115 may take the sidelink preemption indication into account. Otherwise, the first UE 115 may ignore the sidelink preemption indication.

In some examples, the first UE 115 may receive control signaling from a base station 105. The control signaling may include an indication of at least one of a set of resources of a sidelink channel available for sidelink communication with a second UE 115, an indication of a resource allocation mode type for the set of resources, or an indication that the first UE 115 is one of a transmitter or receiver for the set of resources of the sidelink channel, or any combination thereof.

The first UE 115 may perform a sensing operation during a sensing window 305. During the sensing operation, the first UE 115 may receive a sidelink preemption indication 310 indicating that at least a first resource 340 from the set of resources is preempted. In some examples, the first UE 115 may perform the sensing operation to identify that the first resource 340 satisfies a sensing threshold. That is, the first UE 115 may take into account the sidelink preemption indication 310 as additional information for the sensing operation as the indication was received in a timely manner. The first UE 115 may process the sidelink preemption indication 310 to determine that the first resource 340 is available for sidelink communication based on receiving the sidelink preemption indication 310 at least a defined amount of time prior (e.g., during the sensing window 305) to the first resource 340.

The first UE 115 may identify a resource selection trigger 320. The first UE 115 may identify the resource selection trigger 320 after a time period 315 (T1) has elapsed after expiration of the sensing window 305. Upon receiving the resource selection trigger 320, the first UE 115 may perform an availability check during an availability check window 325.

The first UE 115 may communicate the sidelink transmission via the first resource 340 of the sidelink channel based on the first resource 340 being available. In some examples, the first resource 340 may be included in resource selection window 345. The resource selection window 345 may begin after a time period 330 (T2) has elapsed since the resource selection trigger 320. Additionally or alternatively, the first resource 340 may be located within a time period 335 (T3) after the availability check window 325.

Figure 4:
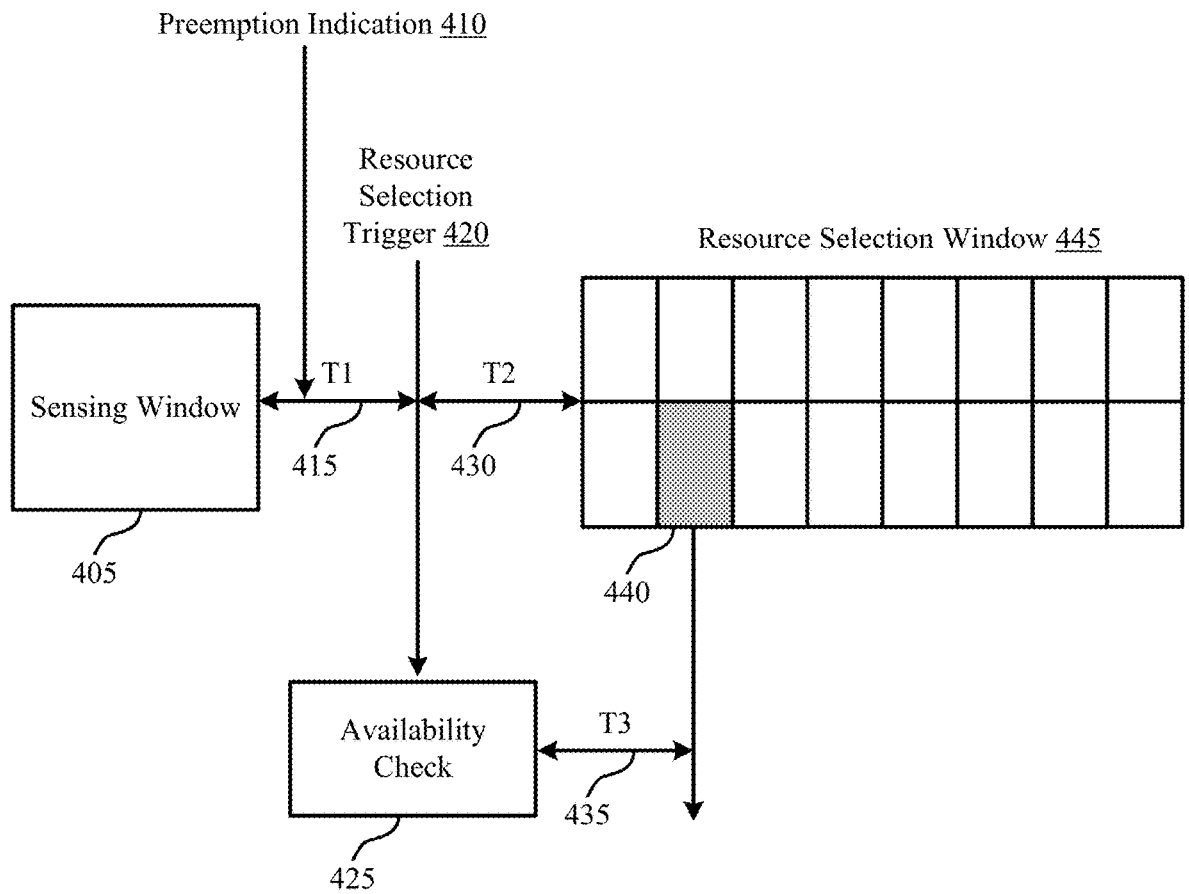
FIG. 4 illustrates an example of a resource reservation procedure in accordance with aspects of the present disclosure.

FIG. 4 illustrates an example of a resource reservation procedure 400 that supports UE behavior with sidelink preemption indication in accordance with aspects of the present disclosure. In some examples, the resource reservation procedure 400 may implement aspects of wireless communications system 100 and the wireless communications system 200 as depicted with reference to FIGS. 1 and 2. In some examples, the resource reservation procedure 400 may be implement by a base station 105 and one or more UEs 115. The base station 105 and the UE 115 may be examples of a base station 105 and a UE 115, as described with reference to FIGS. 1 and 2.

According to one or more aspects of the present disclosure, a first UE 115 may perform sidelink communications with other UEs. In some examples, the first UE 115 may receive control signaling from a base station 105. The control signaling may indicate at least one of a set of resources of a sidelink channel available for sidelink communication with a second UE 115, an indication of a resource allocation mode type for the set of resources, and that the first UE 115 is one of a transmitter or receiver for the set of resources of the sidelink channel.

The first UE 115 may perform a sensing operation during a sensing window 405. After the sensing operation 405, the first UE 115 may receive a sidelink preemption indication 410 indicating that at least a first resource from the set of resources is preempted. In some examples, the first UE 115 may perform the sensing operation to identify that the first resource satisfies a sensing threshold.

The first UE 115 may process the sidelink preemption indication 410 to determine that the first resource is unavailable for sidelink communication based on receiving the sidelink preemption indication 410 at least a defined amount of time prior (e.g., during a time period 415 (T1)) to the first resource. For example, the first UE 115 cannot take the indication 410 into account during the sensing operation that has already occurred, but the first UE 115 may use the sidelink preemption indication 410 during an availability check of a resource identified during the sensing operation.

The first UE 115 may identify a resource selection trigger 420. The first UE 115 may identify the resource selection trigger 420 after the time period 415 has elapsed after expiration of the sensing window 405. Upon receiving the resource selection trigger 420, the first UE 115 may perform an availability check during an availability check window 425. As described herein, since the sidelink preemption indication 410 is received after the sensing window 405, the first UE 115 cannot use the sidelink preemption indication 410 for selecting resources. However, the sidelink preemption indication 410 may be used during the availability check window 425 of the first selected resource.

The first UE 115 may communicate the sidelink transmission via a second resource 440 of the sidelink channel based on the first resource being unavailable. That is, the first UE 115 my reserve the second resource 440. In some examples, the second resource 440 may be included in resource selection window 445. The resource selection window 445 may begin after a time period 430 (T2) has elapsed since the resource selection trigger 420. Additionally or alternatively, the second resource 440 may be located a time period 435 (T3) after the availability check window 425.

Figure 5:
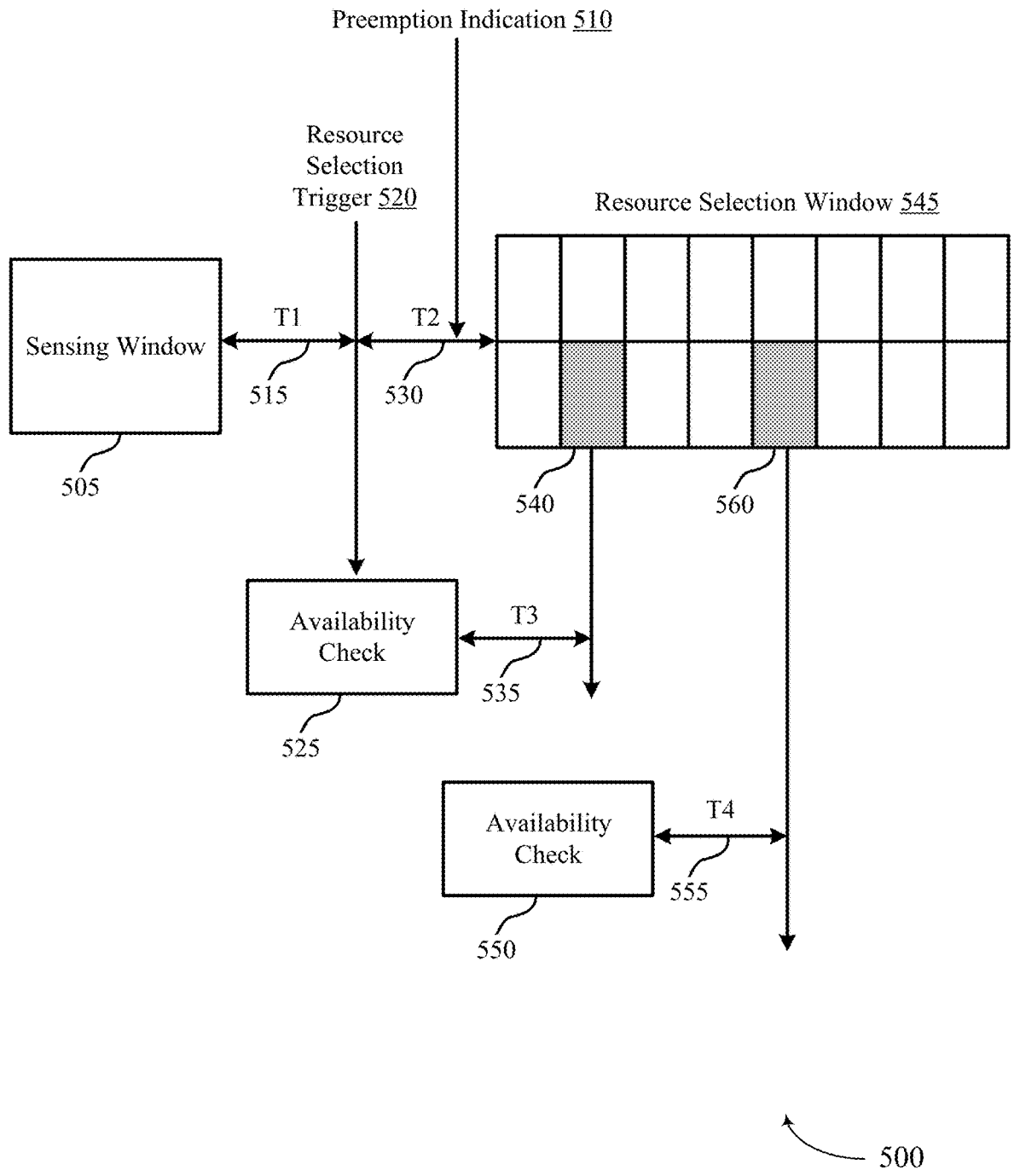
FIG. 5 illustrates an example of a resource reservation procedure in accordance with aspects of the present disclosure.

FIG. 5 illustrates an example of a resource reservation procedure 500 that supports UE behavior with sidelink preemption indication in accordance with aspects of the present disclosure. In some examples, the resource reservation procedure 500 may implement aspects of wireless communications system 100 and the wireless communications system 200 as depicted with reference to FIGS. 1 and 2. In some examples, the resource reservation procedure 500 may be implemented by a base station 105 and one or more UEs 115. The base station 105 and the UE 115 may be examples of a base station 105 and a UE 115, as described with reference to FIGS. 1 and 2.

According to one or more aspects of the present disclosure, a first UE 115 may perform sidelink communications with other UEs. In some examples, the first UE 115 may receive control signaling from a base station 105. The control signaling may indicate at least one of a set of resources of a sidelink channel available for sidelink communication with a second UE 115, an indication of a resource allocation mode type for the set of resources, and that the first UE 115 is one of a transmitter or receiver for the set of resources of the sidelink channel.

The first UE 115 may perform a sensing operation during a sensing window 505. The first UE 115 may identify that a first resource 540 is available for sidelink communication based on the sensing operation. The first UE 115 may identify a resource selection trigger 520. The first UE 115 may identify the resource selection trigger 520 after a time period 515 (T1) has elapsed after expiration of the sensing window 505. Upon receiving the resource selection trigger 520, the first UE 115 may perform an availability check during an availability check window 525. As depicted in the example of FIG. 5, the first UE 115 may communicate the sidelink transmission via the first resource 540 of the sidelink channel. In some examples, the first resource 540 may be included in resource selection window 545. The resource selection window 545 may begin after a time period 530 (T2) has elapsed since the resource selection trigger 520. Additionally or alternatively, the first resource 540 may be located a time period 535 (T3) after the availability check window 525.

After the availability check, the first UE 115 may receive a sidelink preemption indication 510 indicating that at least a resource from the set of resources is preempted. Since the sidelink preemption indication 510 is received after the availability check window 525, the first UE 115 cannot consider the sidelink preemption indication 510 when selecting the first resource 540. The first UE 115 may thus reserve the first resource based on the sidelink preemption indication 510 being received less than a threshold amount of time prior to the first resource 540.

In some examples, the first UE 115 may receive the sidelink preemption indication 510 during the time period 530 (T2). The first UE 115 may process the sidelink preemption indication 510. The first UE 115 may perform a second availability check during an availability check window 550. As depicted in the example of FIG. 5, the first UE 115 may reserve a second resource 560 and may communicate the sidelink transmission via the second resource 560 of the sidelink channel. In some examples, the second resource 560 may be included in resource selection window 545. The resource selection window 545 may begin after a time period 530 (T2) has elapsed since the resource selection trigger 520. Additionally or alternatively, the second resource 560 may be located a time period 555 (T4) after the availability check window 550.

As described herein, since the sidelink preemption indication 510 is received after the availability check window 525, the first UE 115 cannot use the sidelink preemption indication 510 during the availability check for the first resource 540. However, the sidelink preemption indication 510 may be used during the availability check window 550 for the second resource 560.

Figure 6:
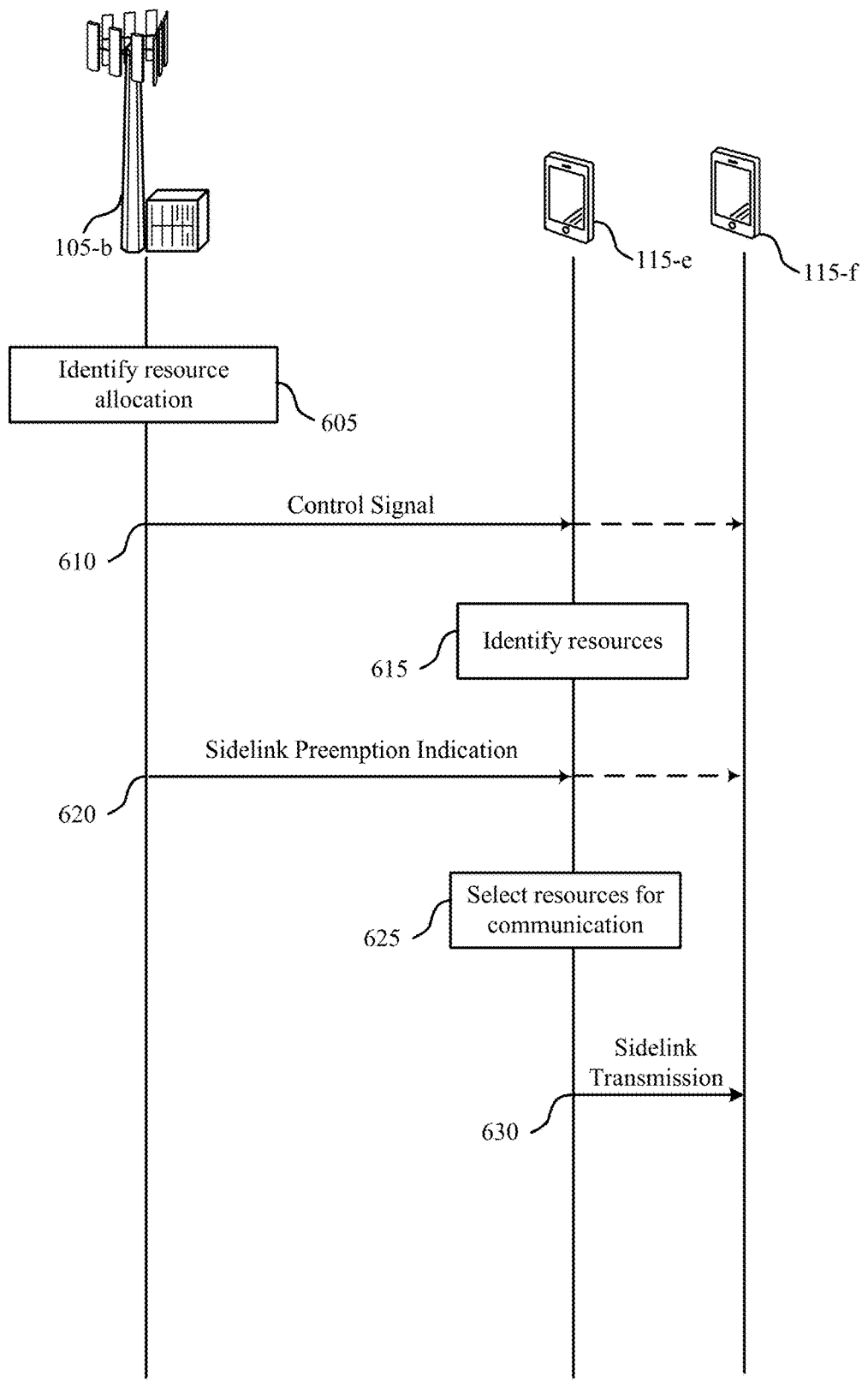
FIG. 6 illustrates an example of a process flow in accordance with aspects of the present disclosure.

FIG. 6 illustrates an example of a process flow 600 that supports UE behavior with sidelink preemption indication in accordance with aspects of the present disclosure. In some examples, the process flow 600 may implement aspects of wireless communications system 100 and the wireless communications system 200 described with reference to FIGS. 1 and 2, respectively. For example, the process flow 600 may be based on one or more rules for inter-UE coordination in sidelink communication. The process flow 600 may be implemented by the UE 115-*e* (UE 1), the UE 115-*f* (UE 2), and the base station 105-*b* for reduced power consumption, and may promote low latency and low interference for wireless communications supporting high priority channels, among other benefits. The base station 105-*b*, the UE 115-*e*, and the UE 115-*f* may be examples of a base station 105 and a UE 115, as described with reference to FIGS. 1 and 2.

In the following description of the process flow 600, the operations between the base station 105-*b*, the UE 115-*e*, and the UE 115-*f* may be transmitted in a different order than the example order shown, or the operations performed by the base station 105-*b*, the UE 115-*e*, and the UE 115-*f* may be performed in different orders or at different times. Some operations may also be omitted from the process flow 600, and other operations may be added to the process flow 600.

At 605, the base station 105-*b* may identify a resource allocation for sidelink communications for the UE 115-*e* and UE 115-*f*. Additionally or alternatively, the base station 105-*b* may identify a resource allocation for sidelink communications for the UE 115-*e* and the UE 115-*f*. In some examples, the configuration may be for resource allocation for a sidelink channel.

At 610, the base station 105-*b* may transmit, to the UE 115-*e* (e.g., first UE or UE 1), control signaling comprising an indication of a set of resources of a sidelink channel available for sidelink communication with a UE 115-*f* (or second UE or UE 2), an indication of a resource allocation mode type for the set of resources, and an indication that the UE 115-*e* is one of a transmitter or receiver for the set of resources of the sidelink channel. In some cases, the base station 105-*b* may optionally transmit a configuration (the same or different) to the UE 115-*f* (e.g., second UE or UE 2).

At 615, the UE 115-*e* (or UE 1) may determine a resource allocation and may identify resources available for performing sidelink communications. At 620, the UE 115-*e* may receive, from the base station 105-*b*, a sidelink preemption indication indicating that at least a first resource from the set of resources is preempted. Additionally or alternatively, the base station 105-*b* may optionally transmit the sidelink preemption indication to the UE 115-*f*.

At 625, the UE 115-*e* (or UE 1) may select resources available for sidelink communications. At 630, the UE 115-*e* may communicate a sidelink transmission over the sidelink channel with the UE 115-*f* based on the sidelink preemption indication (received at 620) and the control signaling (received at 610).

Figure 7:
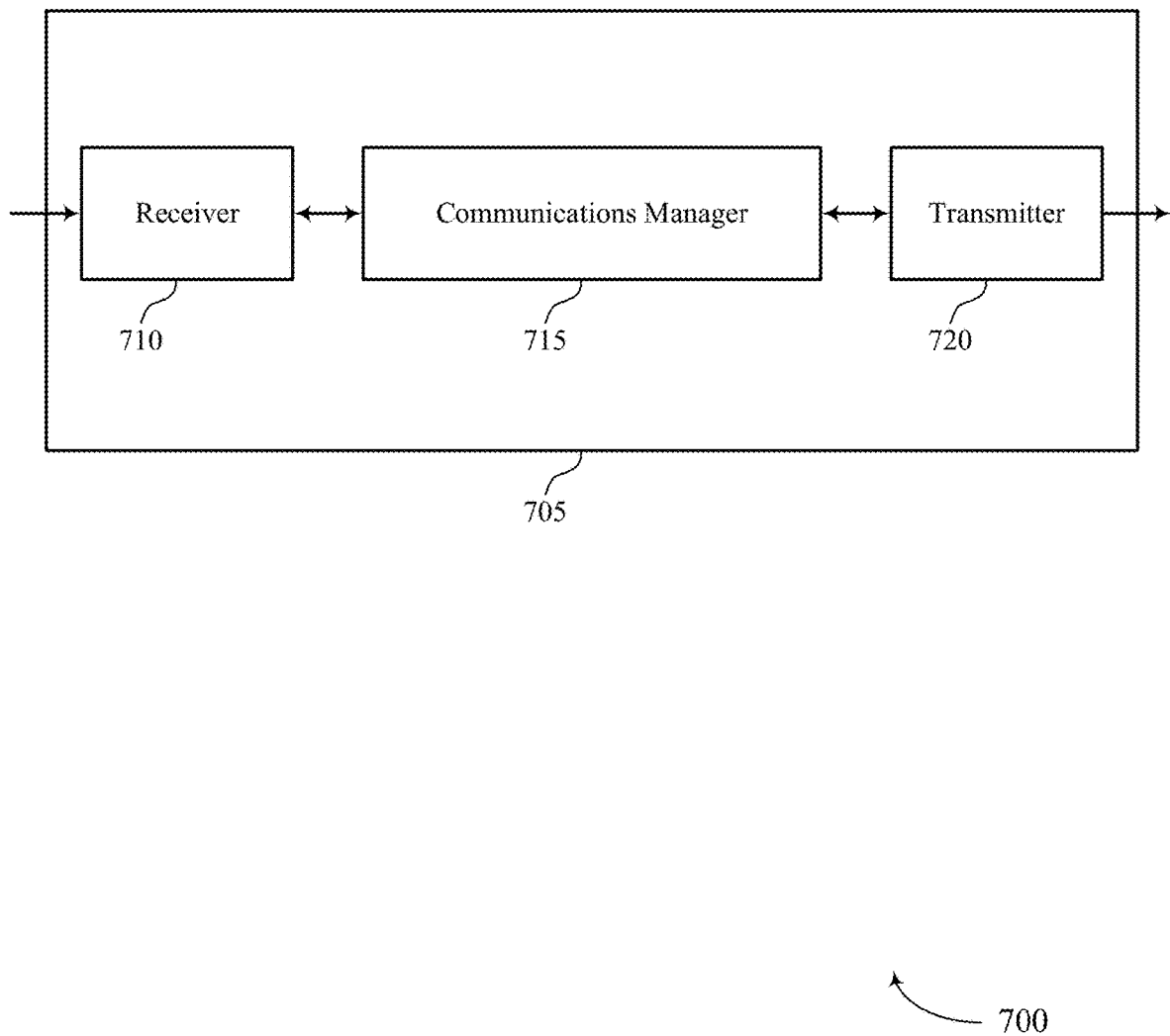
FIGS. 7 and 8 show block diagrams of devices in accordance with aspects of the present disclosure.

FIG. 7 shows a block diagram 700 of a device 705 that supports UE behavior with sidelink preemption indication in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to UE behavior with sidelink preemption indication, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a base station, control signaling comprising an indication of a set of resources of a sidelink channel available for sidelink communication with a second UE, an indication of a resource allocation mode type for the set of resources, and an indication that the first UE is one of a transmitter or receiver for the set of resources of the sidelink channel, receive, from the base station, a sidelink preemption indication indicating that at least a first resource from the set of resources is preempted, and communicate a sidelink transmission over the sidelink channel with the second UE based on the sidelink preemption indication and the control signaling. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
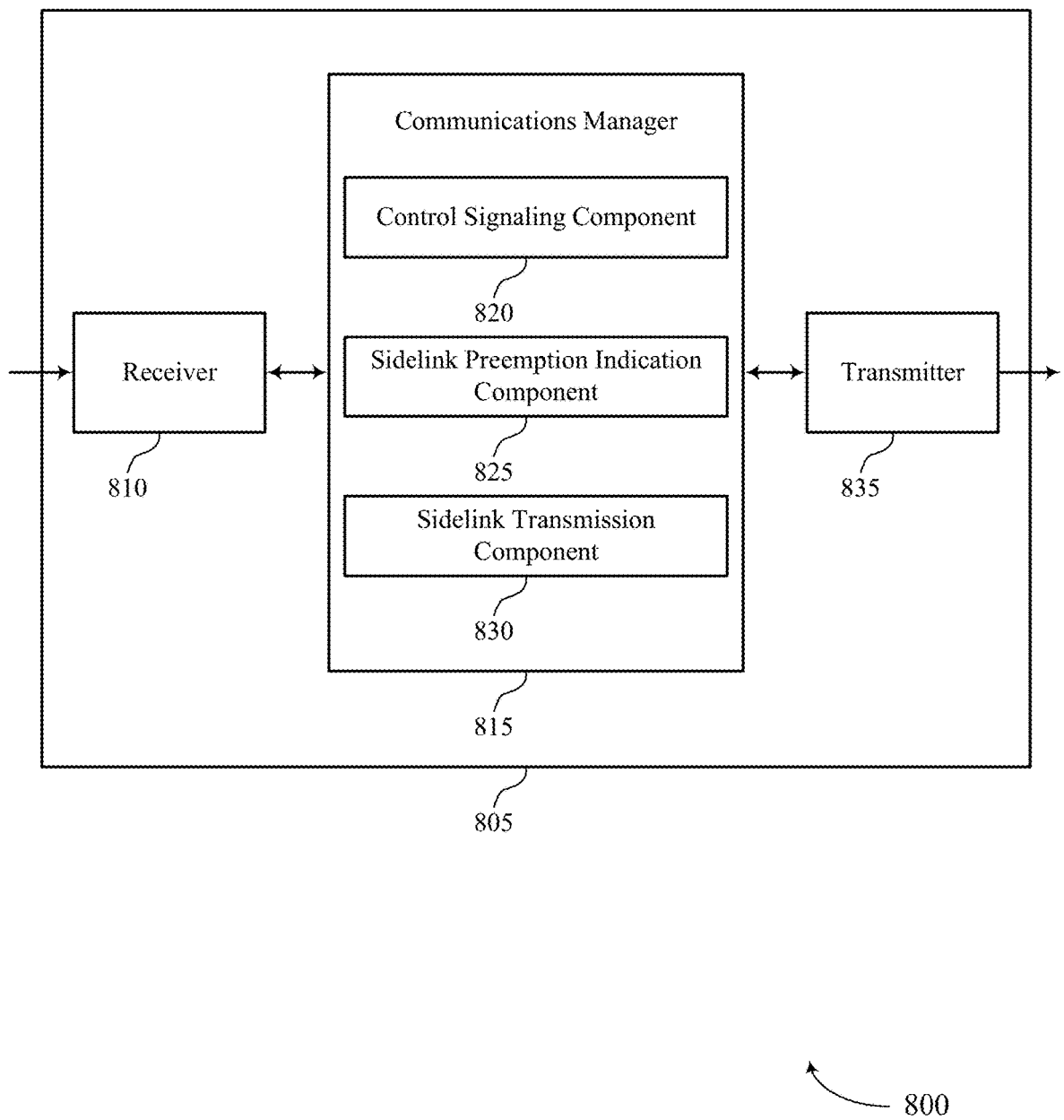

FIG. 8 shows a block diagram 800 of a device 805 that supports UE behavior with sidelink preemption indication in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to UE behavior with sidelink preemption indication, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a control signaling component 820, a sidelink preemption indication component 825, and a sidelink transmission component 830. The communications manager 815 may be an example of aspects of the communications manager 1010 described herein.

The control signaling component 820 may receive, from a base station, control signaling comprising an indication of a set of resources of a sidelink channel available for sidelink communication with a second UE, an indication of a resource allocation mode type for the set of resources, and an indication that the first UE is one of a transmitter or receiver for the set of resources of the sidelink channel. The sidelink preemption indication component 825 may receive, from the base station, a sidelink preemption indication indicating that at least a first resource from the set of resources is preempted. The sidelink transmission component 830 may communicate a sidelink transmission over the sidelink channel with the second UE based on the sidelink preemption indication and the control signaling.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
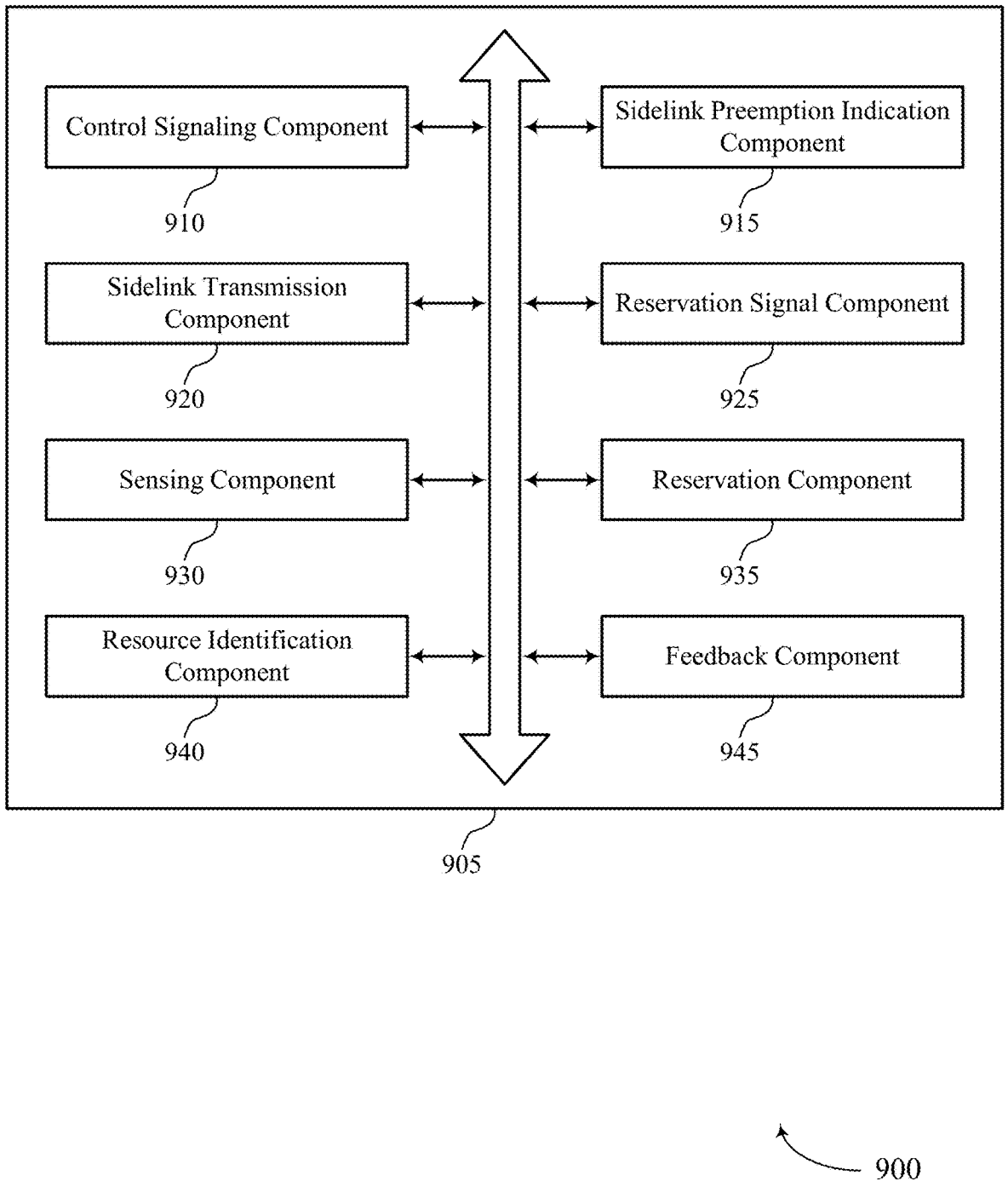
FIG. 9 shows a block diagram of a communications manager in accordance with aspects of the present disclosure.

FIG. 9 shows a block diagram 900 of a communications manager 905 that supports UE behavior with sidelink preemption indication in accordance with aspects of the present disclosure. The communications manager 905 may be an example of aspects of a communications manager 715, a communications manager 815, or a communications manager 1010 described herein. The communications manager 905 may include a control signaling component 910, a sidelink preemption indication component 915, a sidelink transmission component 920, a reservation signal component 925, a sensing component 930, a reservation component 935, a resource identification component 940, and a feedback component 945. Each of these modules may communicate, directly or indirectly, with one another (e.g., via one or more buses).

The control signaling component 910 may receive, from a base station, control signaling comprising an indication of a set of resources of a sidelink channel available for sidelink communication with a second UE, an indication of a resource allocation mode type for the set of resources, and an indication that the first UE is one of a transmitter or receiver for the set of resources of the sidelink channel. In some cases, the resource allocation mode type for the set of resources includes a mode 1 resource allocation type or a mode 2 resource allocation type. In some cases, the set of resources of the sidelink channel includes at least one of a periodic set of resources, a semi-static set of resources, an aperiodic set of resources, or a combination thereof.

The sidelink preemption indication component 915 may receive, from the base station, a sidelink preemption indication indicating that at least a first resource from the set of resources is preempted. In some cases, the sidelink preemption indication indicates at least one of a priority, a power threshold, a zone identifier, a resource pool identifier, a preemption periodicity, a cast type, or a combination thereof. The sidelink transmission component 920 may communicate a sidelink transmission over the sidelink channel with the second UE based on the sidelink preemption indication and the control signaling.

In some examples, the sidelink preemption indication component 915 may receive the sidelink preemption indication that indicates a preemption priority threshold. The reservation signal component 925 may communicate a first reservation signal to reserve the first resource based on a transmission priority associated with the sidelink transmission satisfying the preemption priority threshold.

In some examples, the sidelink preemption indication component 915 may receive the sidelink preemption indication that indicates a first zone. In some examples, the reservation signal component 925 may communicate a first reservation signal to reserve the first resource based on a second zone of the first UE being different from the first zone.

In some examples, the reservation signal component 925 may communicate a first reservation signal to reserve a second resource based on the second resource being different from the first resource. In some examples, the sidelink transmission component 920 may communicate the sidelink transmission via the first resource of the sidelink channel based on reserving the first resource.

In some examples, the sidelink preemption indication component 915 may receive the sidelink preemption indication that indicates a target UE identifier. In some examples, the reservation signal component 925 may communicate a first reservation signal to reserve the first resource based on a UE identifier of the first UE being different from the target UE identifier.

In some examples, the reservation signal component 925 may communicate a reservation signal to reserve the first resource and a second resource from the set of resources based on the control signaling. In some examples, the sidelink transmission component 920 may communicate the sidelink transmission over the second resource of the sidelink channel based on the sidelink preemption indication.

In some examples, the reservation signal component 925 may communicate first reservation signals to reserve the first resource and a second resource from the set of resources based on the control signaling. In some examples, the reservation signal component 925 may communicate second reservation signals to reserve a third resource and a fourth resource from the set of resources of the sidelink channel based on the sidelink preemption indication, where communicating the sidelink transmission is over the third resource and the fourth resource of the sidelink channel. In some cases, the first resource and the second resource are different than the third resource, the fourth resource, or both.

In some examples, the reservation signal component 925 may communicate first reservation signals to reserve the first resource during a first transmission time interval and a second resource from the set of resources based on the control signaling. In some examples, the reservation signal component 925 may communicate second reservation signals to reserve the first resource during a second transmission time interval based on the sidelink preemption indication, where the communicating the sidelink transmission is over the first resource during the second transmission time interval and the second resource.

The sensing component 930 may perform a sensing operation to identify that the first resource satisfies a sensing threshold. In some examples, the sidelink preemption indication component 915 may process the sidelink preemption indication to determine that the first resource is available for sidelink communication based on receiving the sidelink preemption indication at least a defined amount of time prior to the first resource. In some examples, the sidelink transmission component 920 may communicate the sidelink transmission via the first resource of the sidelink channel based on the first resource being available.

In some examples, the sensing component 930 may perform a sensing operation to identify the first resource satisfies a sensing threshold. In some examples, the sidelink preemption indication component 915 may process the sidelink preemption indication to determine that the first resource is unavailable for sidelink communication based on receiving the sidelink preemption indication at least a defined amount of time prior to the first resource. In some examples, the reservation signal component 925 may communicate the sidelink transmission via a second resource of the sidelink channel based on the first resource being unavailable.

In some examples, the sidelink preemption indication component 915 may process the sidelink preemption indication to determine that the first resource is unavailable based on receiving the sidelink preemption indication at least a defined amount of time prior to the first resource. The reservation component 935 may reserve a second resource based on the processing. In some examples, the sidelink transmission component 920 may communicate the sidelink transmission via the second resource.

The resource identification component 940 may identify that the first resource is available for sidelink communication based on the sensing operation. In some examples, the reservation component 935 may reserve the first resource based on the sidelink preemption indication being received less than a threshold amount of time prior to the first resource.

The feedback component 945 may receive, from the second UE, a negative acknowledgement for the sidelink transmission on a sidelink feedback channel based on the sidelink preemption indication.

Figure 10:
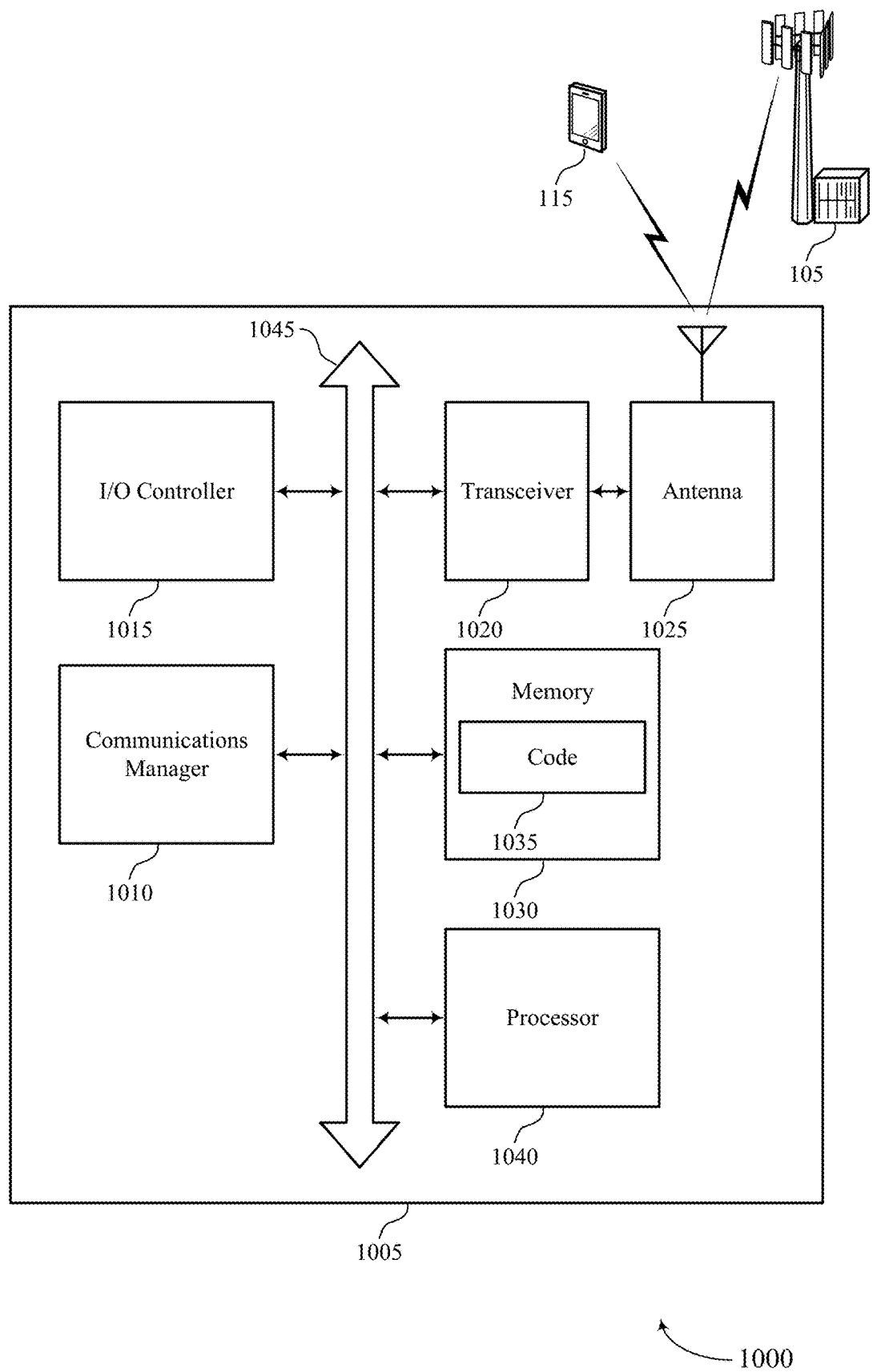
FIG. 10 shows a diagram of a system including a device in accordance with aspects of the present disclosure.

FIG. 10 shows a diagram of a system 1000 including a device 1005 that supports UE behavior with sidelink preemption indication in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive, from a base station, control signaling comprising an indication of a set of resources of a sidelink channel available for sidelink communication with a second UE, an indication of a resource allocation mode type for the set of resources, and that the first UE is one of a transmitter or receiver for the set of resources of the sidelink channel, receive, from the base station, a sidelink preemption indication indicating that at least a first resource from the set of resources is preempted, and communicate a sidelink transmission over the sidelink channel with the second UE based on the sidelink preemption indication and the control signaling.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting UE behavior with sidelink preemption indication).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
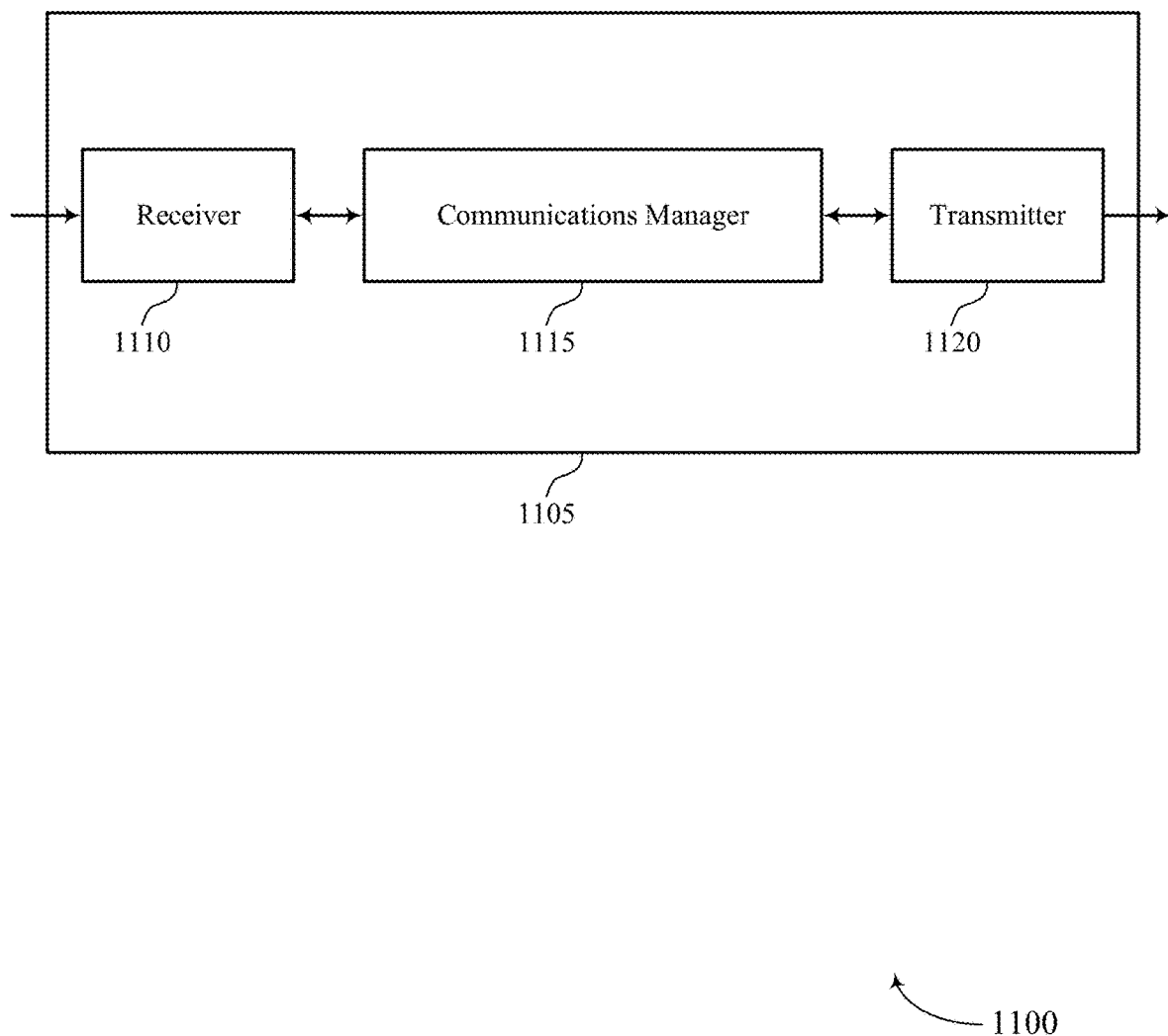
FIGS. 11 and 12 show block diagrams of devices in accordance with aspects of the present disclosure.

FIG. 11 shows a block diagram 1100 of a device 1105 that supports UE behavior with sidelink preemption indication in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to UE behavior with sidelink preemption indication, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit, to a first UE, control signaling comprising an indication of a set of resources of a sidelink channel available for sidelink communication with a second UE, an indication of a resource allocation mode type for the set of resources, and an indication that the first UE is one of a transmitter or receiver for the set of resources of the sidelink channel, determine to preempt a first resource from the set of resources, and transmit, to the first UE, a sidelink preemption indication indicating the first resource is preempted. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
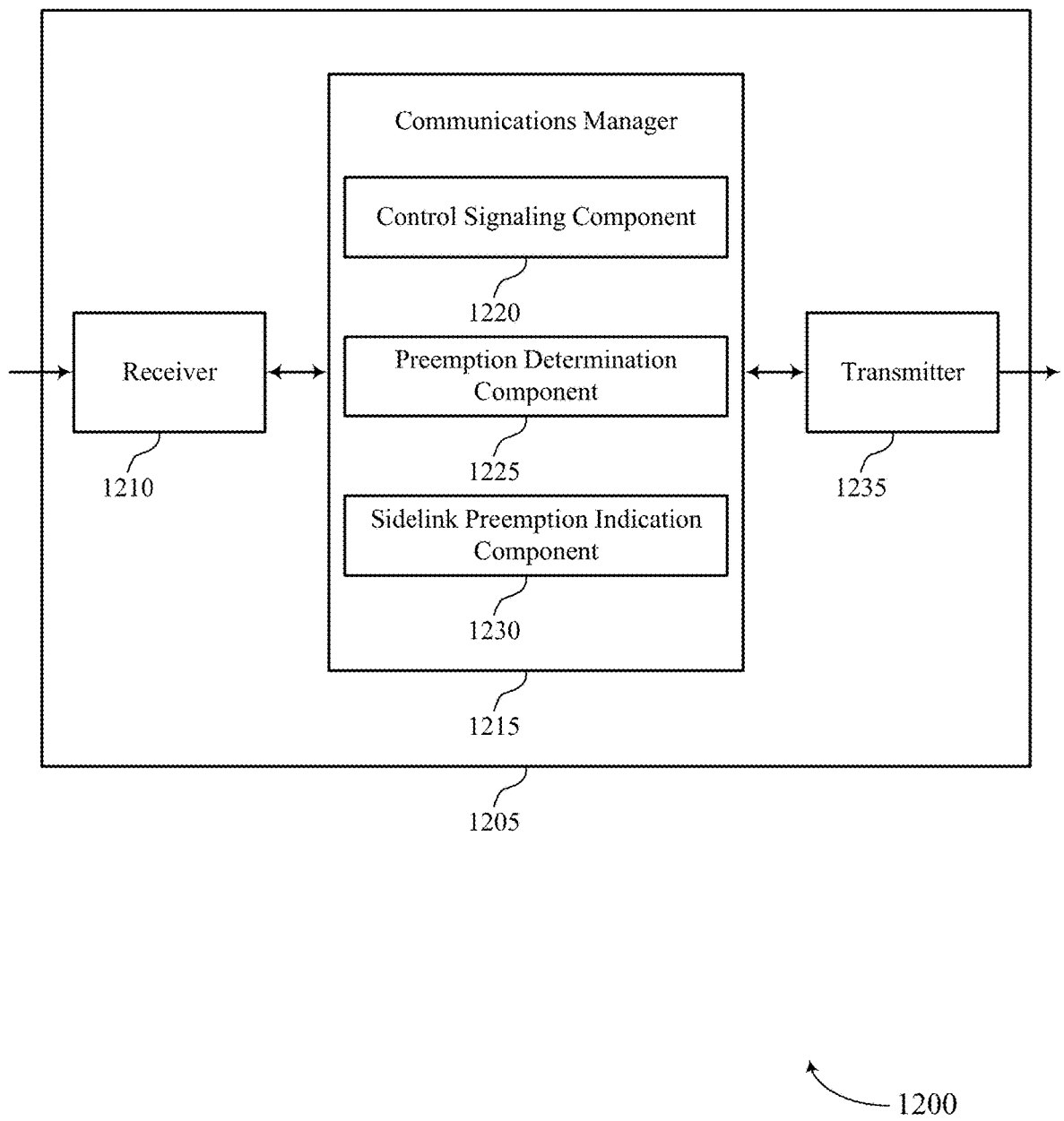

FIG. 12 shows a block diagram 1200 of a device 1205 that supports UE behavior with sidelink preemption indication in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to UE behavior with sidelink preemption indication, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a control signaling component 1220, a preemption determination component 1225, and a sidelink preemption indication component 1230. The communications manager 1215 may be an example of aspects of the communications manager 1410 described herein.

The control signaling component 1220 may transmit, to a first UE, control signaling comprising an indication of a set of resources of a sidelink channel available for sidelink communication with a second UE, an indication of a resource allocation mode type for the set of resources, and an indication that the first UE is one of a transmitter or receiver for the set of resources of the sidelink channel. The preemption determination component 1225 may determine to preempt a first resource from the set of resources. The sidelink preemption indication component 1230 may transmit, to the first UE, a sidelink preemption indication indicating the first resource is preempted.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
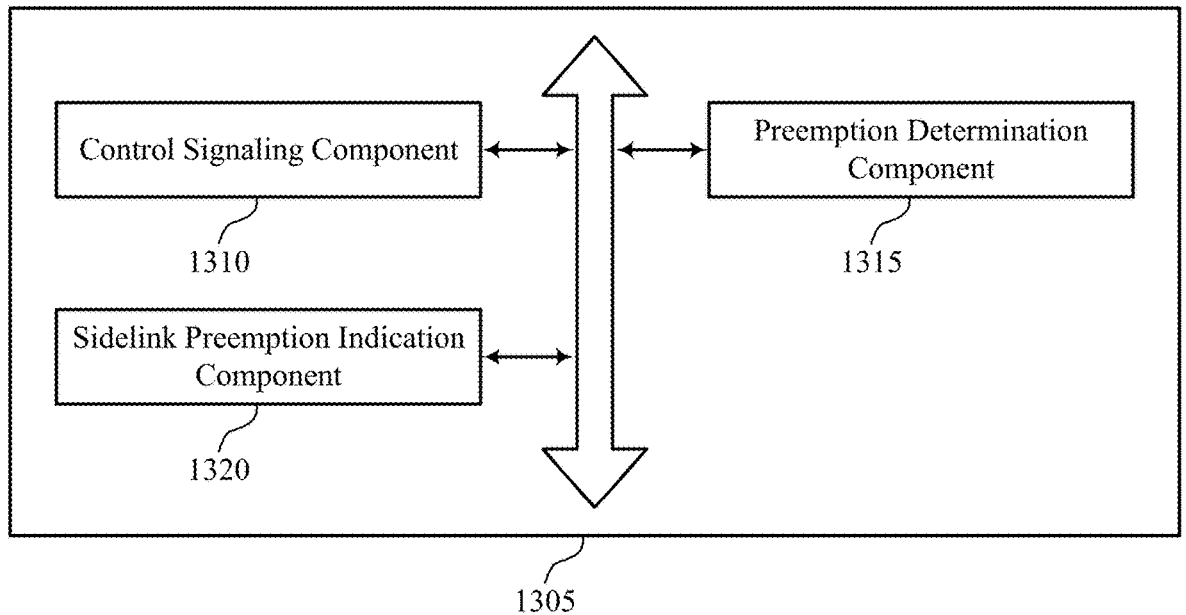
FIG. 13 shows a block diagram of a communications manager in accordance with aspects of the present disclosure.

FIG. 13 shows a block diagram 1300 of a communications manager 1305 that supports UE behavior with sidelink preemption indication in accordance with aspects of the present disclosure. The communications manager 1305 may be an example of aspects of a communications manager 1115, a communications manager 1215, or a communications manager 1410 described herein. The communications manager 1305 may include a control signaling component 1310, a preemption determination component 1315, and a sidelink preemption indication component 1320. Each of these modules may communicate, directly or indirectly, with one another (e.g., via one or more buses).

The control signaling component 1310 may transmit, to a first UE, control signaling comprising an indication of a set of resources of a sidelink channel available for sidelink communication with a second UE, an indication of a resource allocation mode type for the set of resources, and an indication that the first UE is one of a transmitter or receiver for the set of resources of the sidelink channel. In some cases, the resource allocation mode type for the set of resources includes a mode 1 resource allocation type or a mode 2 resource allocation type. In some cases, the set of resources of the sidelink channel includes at least one of a periodic set of resources, a semi-static set of resources, an aperiodic set of resources, or a combination thereof.

The preemption determination component 1315 may determine to preempt a first resource from the set of resources. The sidelink preemption indication component 1320 may transmit, to the first UE, a sidelink preemption indication indicating the first resource is preempted.

In some examples, the sidelink preemption indication component 1320 may transmit the sidelink preemption indication that indicates a preemption priority threshold. In some examples, the sidelink preemption indication component 1320 may transmit the sidelink preemption indication that indicates a zone identifier.

In some examples, the sidelink preemption indication component 1320 may transmit the sidelink preemption indication that indicates a power threshold. In some examples, the sidelink preemption indication component 1320 may transmit the sidelink preemption indication that indicates a preemption periodicity.

In some examples, the sidelink preemption indication component 1320 may transmit the sidelink preemption indication that indicates a resource pool identifier. In some examples, the sidelink preemption indication component 1320 may transmit the sidelink preemption indication that indicates a cast type.

Figure 14:
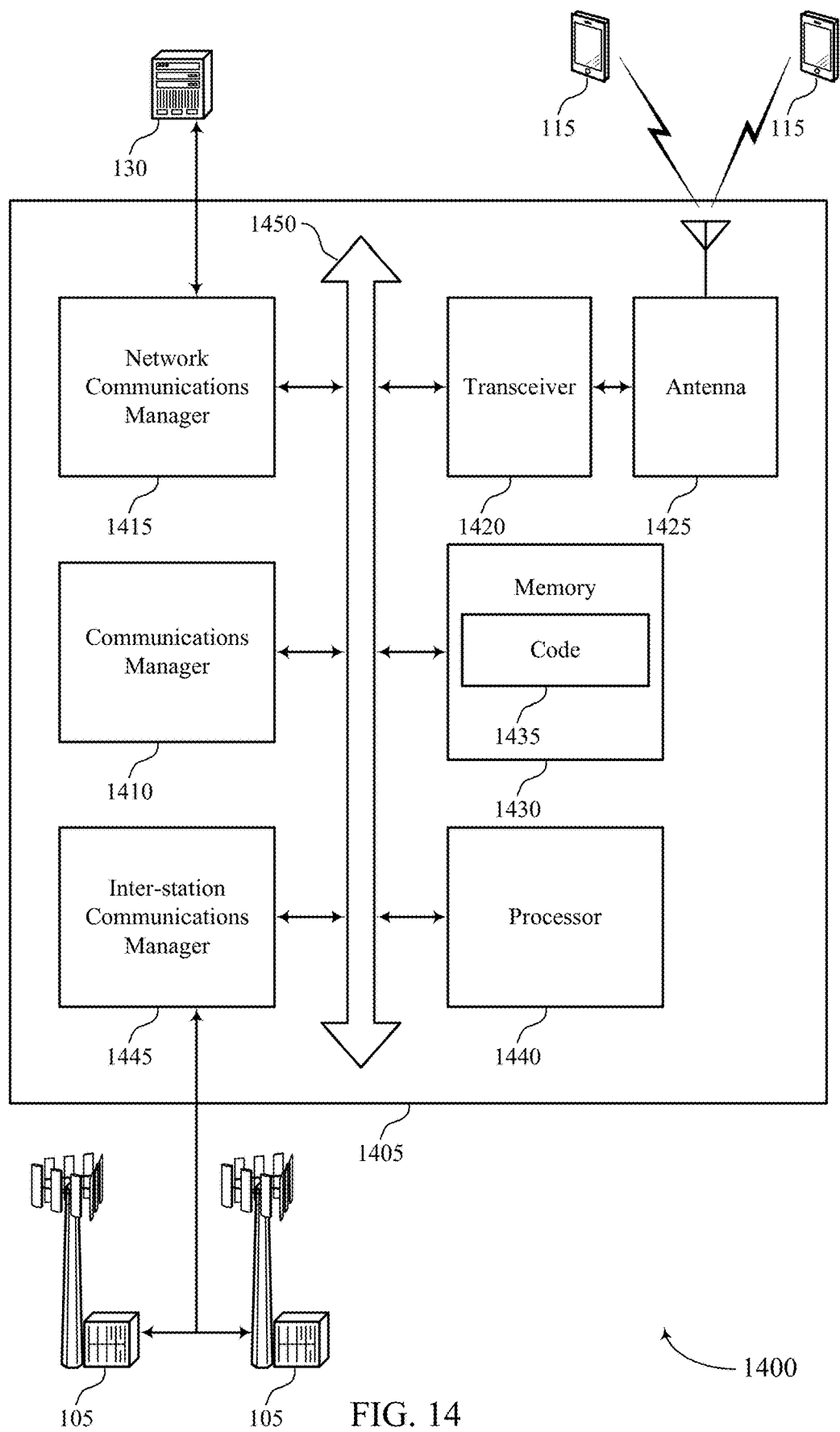
FIG. 14 shows a diagram of a system including a device in accordance with aspects of the present disclosure.

FIG. 14 shows a diagram of a system 1400 including a device 1405 that supports UE behavior with sidelink preemption indication in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit, to a first UE, control signaling comprising an indication of a set of resources of a sidelink channel available for sidelink communication with a second UE, an indication of a resource allocation mode type for the set of resources, and an indication that the first UE is one of a transmitter or receiver for the set of resources of the sidelink channel, determine to preempt a first resource from the set of resources, and transmit, to the first UE, a sidelink preemption indication indicating the first resource is preempted.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting UE behavior with sidelink preemption indication).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
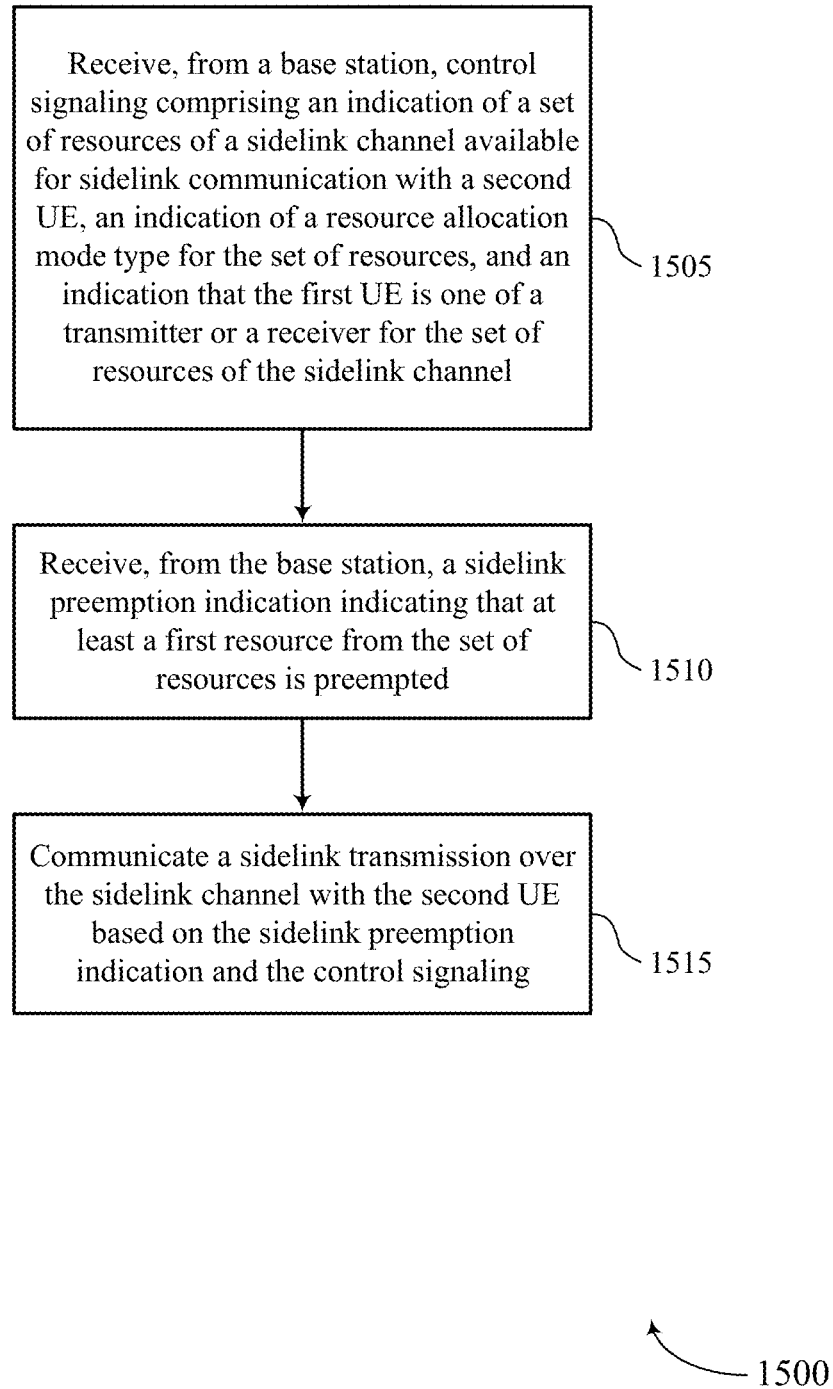
FIGS. 15 through 17 show flowcharts illustrating methods in accordance with aspects of the present disclosure.

FIG. 15 shows a flowchart illustrating a method 1500 that supports UE behavior with sidelink preemption indication in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1505, the UE may receive, from a base station, control signaling comprising an indication of a set of resources of a sidelink channel available for sidelink communication with a second UE, an indication of a resource allocation mode type for the set of resources, and an indication that the first UE is one of a transmitter or a receiver for the set of resources of the sidelink channel. The operations of 1505 may be performed according to the methods described herein. In some examples, aspects of the operations of 1505 may be performed by a control signaling component as described with reference to FIGS. 7 through 10.

At 1510, the UE may receive, from the base station, a sidelink preemption indication indicating that at least a first resource from the set of resources is preempted. The operations of 1510 may be performed according to the methods described herein. In some examples, aspects of the operations of 1510 may be performed by a sidelink preemption indication component as described with reference to FIGS. 7 through 10.

At 1515, the UE may communicate a sidelink transmission over the sidelink channel with the second UE based on the sidelink preemption indication and the control signaling. The operations of 1515 may be performed according to the methods described herein. In some examples, aspects of the operations of 1515 may be performed by a sidelink transmission component as described with reference to FIGS. 7 through 10.

Figure 16:
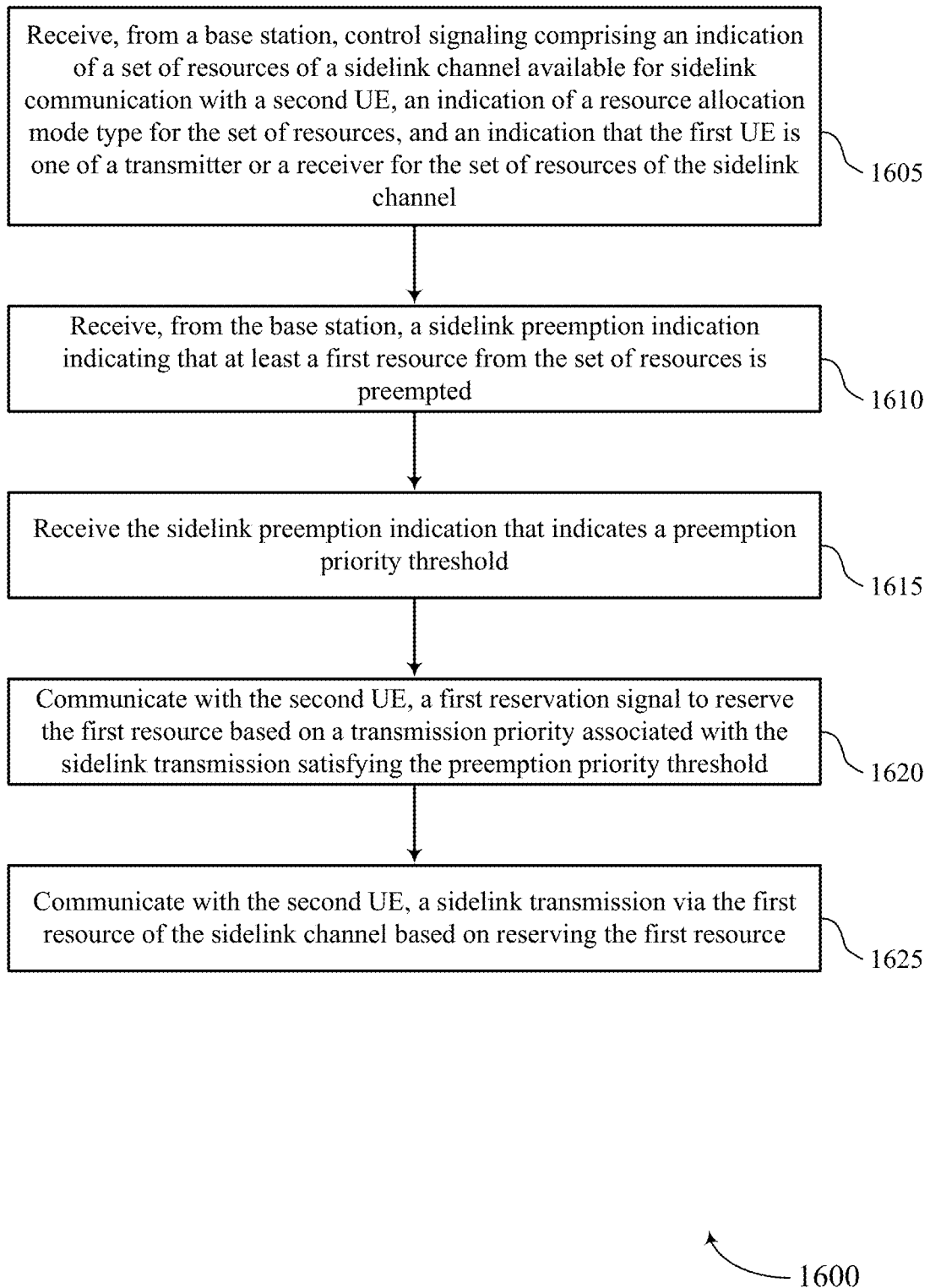

FIG. 16 shows a flowchart illustrating a method 1600 that supports UE behavior with sidelink preemption indication in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1605, the UE may receive, from a base station, control signaling comprising an indication of a set of resources of a sidelink channel available for sidelink communication with a second UE, an indication of a resource allocation mode type for the set of resources, and an indication that the first UE is one of a transmitter or a receiver for the set of resources of the sidelink channel. The operations of 1605 may be performed according to the methods described herein. In some examples, aspects of the operations of 1605 may be performed by a control signaling component as described with reference to FIGS. 7 through 10.

At 1610, the UE may receive, from the base station, a sidelink preemption indication indicating that at least a first resource from the set of resources is preempted. The operations of 1610 may be performed according to the methods described herein. In some examples, aspects of the operations of 1610 may be performed by a sidelink preemption indication component as described with reference to FIGS. 7 through 10.

At 1615, the UE may receive the sidelink preemption indication that indicates a preemption priority threshold. The operations of 1615 may be performed according to the methods described herein. In some examples, aspects of the operations of 1615 may be performed by a sidelink preemption indication component as described with reference to FIGS. 7 through 10.

At 1620, the UE may communicate, with the second UE, a first reservation signal to reserve the first resource based on a transmission priority associated with the sidelink transmission satisfying the preemption priority threshold. The operations of 1620 may be performed according to the methods described herein. In some examples, aspects of the operations of 1620 may be performed by a reservation signal component as described with reference to FIGS. 7 through 10.

At 1625, the UE may communicate, with the second UE, the sidelink transmission via the first resource of the sidelink channel based on reserving the first resource. The operations of 1625 may be performed according to the methods described herein. In some examples, aspects of the operations of 1625 may be performed by a sidelink transmission component as described with reference to FIGS. 7 through 10.

Figure 17:
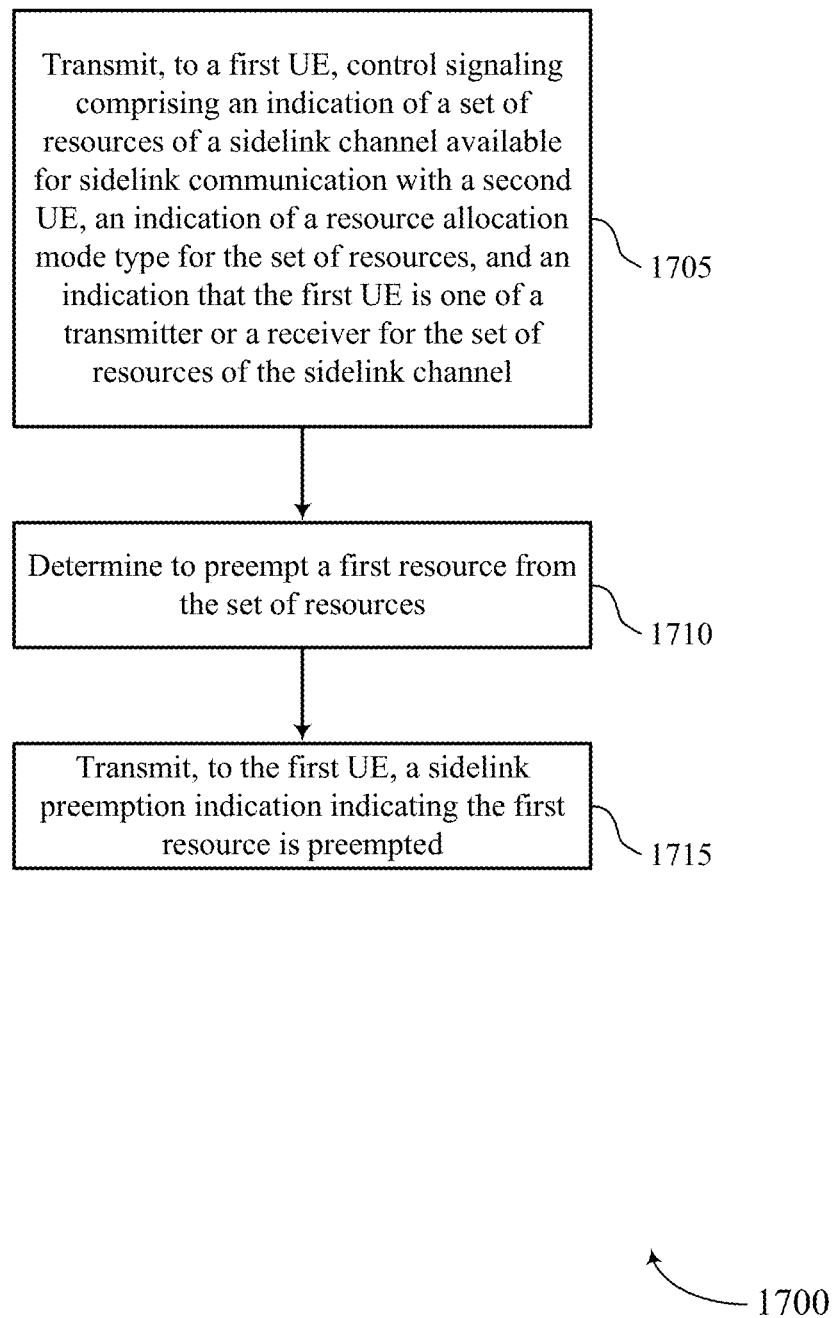

FIG. 17 shows a flowchart illustrating a method 1700 that supports UE behavior with sidelink preemption indication in accordance with aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1705, the base station may transmit, to a first UE, control signaling comprising an indication of a set of resources of a sidelink channel available for sidelink communication with a second UE, an indication of a resource allocation mode type for the set of resources, and an indication that the first UE is one of a transmitter or receiver for the set of resources of the sidelink channel. The operations of 1705 may be performed according to the methods described herein. In some examples, aspects of the operations of 1705 may be performed by a control signaling component as described with reference to FIGS. 11 through 14.

At 1710, the base station may determine to preempt a first resource from the set of resources. The operations of 1710 may be performed according to the methods described herein. In some examples, aspects of the operations of 1710 may be performed by a preemption determination component as described with reference to FIGS. 11 through 14.

At 1715, the base station may transmit, to the first UE, a sidelink preemption indication indicating the first resource is preempted. The operations of 1715 may be performed according to the methods described herein. In some examples, aspects of the operations of 1715 may be performed by a sidelink preemption indication component as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a first UE, comprising: receiving, from a base station, control signaling comprising an indication of a set of resources of a sidelink channel available for sidelink communication with a second UE, an indication of a resource allocation mode type for the set of resources, and an indication that the first UE is one of a transmitter or a receiver for the set of resources of the sidelink channel; receiving, from the base station, a sidelink preemption indication indicating that at least a first resource from the set of resources is preempted; and communicating a sidelink transmission over the sidelink channel with the second UE based at least in part on the sidelink preemption indication and the control signaling.

Aspect 2: The method of aspect 1, further comprising: receiving the sidelink preemption indication that indicates a preemption priority threshold; communicating to the second UE, a first reservation signal to reserve the first resource based at least in part on a transmission priority associated with the sidelink transmission satisfying the preemption priority threshold; and communicating to the second UE, the sidelink transmission via the first resource of the sidelink channel based at least in part on reserving the first resource.

Aspect 3: The method of any of aspects 1 through 2, further comprising: receiving the sidelink preemption indication that indicates a first zone; communicating to the second UE, a first reservation signal to reserve the first resource based at least in part on a second zone of the first UE being different from the first zone; and communicating to the second UE, the sidelink transmission via the first resource of the sidelink channel based at least in part on reserving the first resource.

Aspect 4: The method of any of aspects 1 through 3, further comprising: communicating a first reservation signal to reserve a second resource based at least in part on the second resource being different from the first resource; and communicating the sidelink transmission via the second resource of the sidelink channel based at least in part on reserving the second resource.

Aspect 5: The method of any of aspects 1 through 4, further comprising: receiving the sidelink preemption indication that indicates a target UE identifier; communicating a first reservation signal to reserve the first resource based at least in part on a UE identifier of the first UE being different from the target UE identifier; and communicating the sidelink transmission via the first resource of the sidelink channel based at least in part on reserving the first resource.

Aspect 6: The method of any of aspects 1 through 5, further comprising: communicating to the second UE, a reservation signal to reserve the first resource and a second resource from the set of resources based at least in part on the control signaling; and communicating to the second UE, the sidelink transmission over the second resource of the sidelink channel based at least in part on the sidelink preemption indication.

Aspect 7: The method of any of aspects 1 through 6, further comprising: communicating first reservation signals to reserve the first resource and a second resource from the set of resources based at least in part on the control signaling; and communicating second reservation signals to reserve a third resource and a fourth resource from the set of resources of the sidelink channel based at least in part on the sidelink preemption indication, wherein communicating the sidelink transmission is over the third resource and the fourth resource of the sidelink channel.

Aspect 8: The method of aspect 7, wherein the first resource and the second resource are different than the third resource, the fourth resource, or both.

Aspect 9: The method of any of aspects 1 through 8, further comprising: communicating first reservation signals to reserve the first resource and a second resource from the set of resources during a first transmission time interval based at least in part on the control signaling; and communicating second reservation signals to reserve the first resource during a second transmission time interval based at least in part on the sidelink preemption indication, wherein the communicating the sidelink transmission is over the first resource and the second resource during the second transmission time interval.

Aspect 10: The method of any of aspects 1 through 9, further comprising: determining that the first resource satisfies a sensing threshold; determining that the first resource is available for sidelink communication based at least in part on receiving the sidelink preemption indication at least a defined amount of time prior to the first resource; and communicating the sidelink transmission via the first resource of the sidelink channel based at least in part on the first resource being available.

Aspect 11: The method of any of aspects 1 through 10, further comprising: performing a sensing operation to identify that the first resource satisfies a sensing threshold; processing the sidelink preemption indication to determine that the first resource is unavailable for sidelink communication based at least in part on receiving the sidelink preemption indication at least a defined amount of time prior to the first resource; and communicating the sidelink transmission via a second resource of the sidelink channel based at least in part on the first resource being unavailable.

Aspect 12: The method of any of aspects 1 through 11, further comprising: performing a sensing operation to identify the first resource satisfies a sensing threshold; processing the sidelink preemption indication to determine that the first resource is unavailable based at least in part on receiving the sidelink preemption indication at least a defined amount of time prior to the first resource; reserving a second resource based at least in part on the processing; and communicating the sidelink transmission via the second resource.

Aspect 13: The method of any of aspects 1 through 12, further comprising: performing a sensing operation to identify that the first resource satisfies a sensing threshold; identifying that the first resource is available for sidelink communication based at least in part on the sensing operation; reserving the first resource based at least in part on the sidelink preemption indication being received less than a threshold amount of time prior to the first resource; and communicating the sidelink transmission via the first resource of the sidelink channel based at least in part on reserving the first resource.

Aspect 14: The method of any of aspects 1 through 13, further comprising: receiving, from the second UE, a negative acknowledgement for the sidelink transmission on a sidelink feedback channel based at least in part on the sidelink preemption indication.

Aspect 15: The method of any of aspects 1 through 14, wherein the sidelink preemption indication indicates at least one of a priority, a power threshold, a zone identifier, a resource pool identifier, a preemption periodicity, a cast type, or a combination thereof.

Aspect 16: The method of any of aspects 1 through 15, wherein the resource allocation mode type for the set of resources comprises a mode 1 resource allocation type or a mode 2 resource allocation type.

Aspect 17: The method of any of aspects 1 through 16, wherein the set of resources of the sidelink channel comprises at least one of a periodic set of resources, a semi-static set of resources, an aperiodic set of resources, or a combination thereof.

Aspect 18: A method for wireless communication at a base station, comprising: transmitting, to a first UE, control signaling comprising an indication of a set of resources of a sidelink channel available for sidelink communication with a second UE, an indication of a resource allocation mode type for the set of resources, and an indication that the first UE is one of a transmitter or a receiver for the set of resources of the sidelink channel; determining to preempt a first resource from the set of resources; and transmitting, to the first UE, a sidelink preemption indication indicating the first resource is preempted.

Aspect 19: The method of aspect 18, wherein transmitting the sidelink preemption indication comprises: transmitting the sidelink preemption indication that indicates a preemption priority threshold.

Aspect 20: The method of any of aspects 18 through 19, further comprising: transmitting the sidelink preemption indication that indicates a zone identifier.

Aspect 21: The method of any of aspects 18 through 20, further comprising: transmitting the sidelink preemption indication that indicates a power threshold.

Aspect 22: The method of any of aspects 18 through 21, further comprising: transmitting the sidelink preemption indication that indicates a preemption periodicity.

Aspect 23: The method of any of aspects 18 through 22, further comprising: transmitting the sidelink preemption indication that indicates a resource pool identifier.

Aspect 24: The method of any of aspects 18 through 23, further comprising: transmitting the sidelink preemption indication that indicates a cast type.

Aspect 25: The method of any of aspects 18 through 24, wherein the resource allocation mode type for the set of resources comprises a mode 1 resource allocation type or a mode 2 resource allocation type.

Aspect 26: The method of any of aspects 18 through 25, wherein the set of resources of the sidelink channel comprises at least one of a periodic set of resources, a semi-static set of resources, an aperiodic set of resources, or a combination thereof.

Aspect 27: An apparatus for wireless communication at a first UE, comprising a processor; memory coupled with the processor; and instructions stored in the memory and executable by the processor to cause the apparatus to perform a method of any of aspects 1 through 17.

Aspect 28: An apparatus for wireless communication at a base station, comprising a processor; memory coupled with the processor; and instructions stored in the memory and executable by the processor to cause the apparatus to perform a method of any of aspects 18 through 26.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a first user equipment (UE), comprising:
    at least one processor;
    memory coupled with the at least one processor; and
    instructions stored in the memory and executable by the at least one processor to cause the apparatus to:
        receive, from a network device, control signaling comprising an indication of a set of resources of a sidelink channel available for sidelink communication with a second UE, an indication of a resource allocation mode type for the set of resources, and an indication that the first UE is one of either a transmitter or a receiver for the sidelink communication with the second UE for the set of resources;
        receive, from the network device, a sidelink preemption indication indicating that at least a first resource from the set of resources is preempted for an uplink or downlink communication;
        communicate, with the second UE, a first reservation signal to reserve the first resource based at least in part on the resource allocation mode type indicated by the control signaling and further based at least in part on the sidelink preemption indication being received less than a threshold amount of time prior to the first resource; and
        communicate a sidelink transmission over the sidelink channel with the second UE based at least in part on the sidelink preemption indication and the control signaling, wherein communication of the sidelink transmission is via the first resource and based at least in part on reservation of the first resource.

2. The apparatus of claim 1, wherein the instructions are further executable by the at least one processor to cause the apparatus to:
    receive the sidelink preemption indication that indicates a preemption priority threshold; and communicate with the second UE the first reservation signal to reserve the first resource based at least in part on a transmission priority associated with the sidelink transmission satisfying the preemption priority threshold.

3. The apparatus of claim 1, wherein the instructions are further executable by the at least one processor to cause the apparatus to:
    receive the sidelink preemption indication that indicates a first zone; and
    communicate with the second UE, the first reservation signal to reserve the first resource based at least in part on a second zone of the first UE being different from the first zone.

4. The apparatus of claim 1, wherein the instructions are further executable by the at least one processor to cause the apparatus to:
communicate the first reservation signal or a second reservation signal to reserve a second resource based at least in part on the second resource being different from the first resource; and
communicate the sidelink transmission via the second resource of the sidelink channel based at least in part on reservation of the second resource.

5. The apparatus of claim 1, wherein the instructions are further executable by the at least one processor to cause the apparatus to:
receive the sidelink preemption indication that indicates a target UE identifier; and
communicate the first reservation signal to reserve the first resource based at least in part on a UE identifier of the first UE being different from the target UE identifier.

6. The apparatus of claim 1, wherein the instructions are further executable by the at least one processor to cause the apparatus to:
communicate with the second UE, the first reservation signal to reserve the first resource and a second resource from the set of resources based at least in part on the control signaling; and
communicate with the second UE, the sidelink transmission over the second resource of the sidelink channel based at least in part on the sidelink preemption indication.

7. The apparatus of claim 1, wherein the instructions are further executable by the at least one processor to cause the apparatus to:
communicate first reservation signals to reserve the first resource and a second resource from the set of resources based at least in part on the control signaling, the first reservation signals comprising the first reservation signal; and
communicate second reservation signals to reserve a third resource and a fourth resource from the set of resources based at least in part on the sidelink preemption indication, wherein communicating the sidelink transmission is over the third resource and the fourth resource of the sidelink channel.

8. The apparatus of claim 7, wherein the first resource and the second resource are different than the third resource, the fourth resource, or both.

9. The apparatus of claim 1, wherein the instructions are further executable by the at least one processor to cause the apparatus to:
communicate first reservation signals to reserve the first resource and a second resource from the set of resources during a first transmission time interval based at least in part on the control signaling, the first reservation signals comprising the first reservation signal; and
communicate second reservation signals to reserve the first resource during a second transmission time interval based at least in part on the sidelink preemption indication, wherein communication of the sidelink transmission is over the first resource and the second resource during the second transmission time interval.

10. The apparatus of claim 1, wherein the instructions are further executable by the at least one processor to cause the apparatus to:
determine that the first resource satisfies a sensing threshold;
determine that the first resource is available for sidelink communication based at least in part on receiving the sidelink preemption indication less than the threshold amount of time prior to the first resource; and
communicate the sidelink transmission via the first resource of the sidelink channel based at least in part on the first resource being available.

11. The apparatus of claim 1, wherein the sidelink preemption indication indicates at least one of a priority, a power threshold, a zone identifier, a resource pool identifier, a preemption periodicity, a cast type, or a combination thereof.

12. The apparatus of claim 1, wherein the set of resources comprises at least one of a periodic set of resources, a semi-static set of resources, an aperiodic set of resources, or a combination thereof.

13. The apparatus of claim 1, wherein the instructions are further executable by the at least one processor to cause the apparatus to:
perform a sensing operation to identify that the first resource satisfies a sensing threshold;
identify that the first resource is available for sidelink communication based at least in part on the sensing operation; and
communicate the sidelink transmission via the first resource of the sidelink channel based at least in part on reservation of the first resource.

14. The apparatus of claim 1, wherein the instructions are further executable by the at least one processor to cause the apparatus to:
receive, from the second UE, a negative acknowledgement for the sidelink transmission on a sidelink feedback channel based at least in part on the sidelink preemption indication.

15. An apparatus for wireless communication at a first user equipment (UE), comprising:
at least one processor;
memory coupled with the at least one processor; and
instructions stored in the memory and executable by the at least one processor to cause the apparatus to:
receive, from a network device, control signaling comprising an indication of a set of resources of a sidelink channel available for sidelink communication with a second UE, an indication of a resource allocation mode type for the set of resources, and an indication that the first UE is one of either a transmitter or a receiver for the sidelink communication with the second UE for the set of resources;
receive, from the network device, a sidelink preemption indication indicating that at least a first resource from the set of resources is preempted for an uplink or downlink communication;
perform a sensing operation to identify that the first resource satisfies a sensing threshold;
process the sidelink preemption indication to determine that the first resource is unavailable for sidelink communication based at least in part on reception of the sidelink preemption indication at least a defined amount of time prior to the first resource; and
communicate a sidelink transmission over the sidelink channel with the second UE based at least in part on the sidelink preemption indication and the control signaling, wherein communication of the sidelink transmission is via a second resource of the sidelink channel based at least in part on the first resource being unavailable.

16. The apparatus of claim 15, wherein the instructions are further executable by the at least one processor to cause the apparatus to:
receive, from the second UE, a negative acknowledgement for the sidelink transmission on a sidelink feedback channel based at least in part on the sidelink preemption indication.

17. An apparatus for wireless communication at a first user equipment (UE), comprising:
at least one processor;
memory coupled with the at least one processor; and
instructions stored in the memory and executable by the at least one processor to cause the apparatus to:
receive, from a network device, control signaling comprising an indication of a set of resources of a sidelink channel available for sidelink communication with a second UE, an indication of a resource allocation mode type for the set of resources, and an indication that the first UE is one of either a transmitter or a receiver for the sidelink communication with the second UE for the set of resources;
receive, from the network device, a sidelink preemption indication indicating that at least a first resource from the set of resources is preempted for an uplink or downlink communication;
perform a sensing operation to identify the first resource satisfies a sensing threshold;
process the sidelink preemption indication to determine that the first resource is unavailable based at least in part on reception of the sidelink preemption indication at least a defined amount of time prior to the first resource;
reserve a second resource based at least in part on the processing; and
communicate a sidelink transmission over the sidelink channel with the second UE based at least in part on the sidelink preemption indication and the control signaling, wherein communication of the sidelink transmission is via the second resource.

18. A method for wireless communication at a first user equipment (UE), comprising:
receiving, from a network device, control signaling comprising an indication of a set of resources of a sidelink channel available for sidelink communication with a second UE, an indication of a resource allocation mode type for the set of resources, and an indication that the first UE is one of either a transmitter or a receiver for the sidelink communication with the second UE for the set of resources;
receiving, from the network device, a sidelink preemption indication indicating that at least a first resource from the set of resources is preempted for an uplink or downlink communication;
communicating with the second UE, a first reservation signal to reserve the first resource based at least in part on the resource allocation mode type indicated by the control signaling and further based at least in part on the sidelink preemption indication being received less than a threshold amount of time prior to the first resource; and
communicating a sidelink transmission over the sidelink channel with the second UE based at least in part on the sidelink preemption indication and the control signaling, wherein communication of the sidelink transmission is via the first resource and based at least in part on reservation of the first resource.

19. The method of claim 18, further comprising:
receiving the sidelink preemption indication that indicates a preemption priority threshold; and
communicating to the second UE, the first reservation signal to reserve the first resource based at least in part on a transmission priority associated with the sidelink transmission satisfying the preemption priority threshold.

20. The method of claim 18, further comprising:
receiving the sidelink preemption indication that indicates a first zone; and
communicating with the second UE, the first reservation signal to reserve the first resource based at least in part on a second zone of the first UE being different from the first zone.

21. The method of claim 18, further comprising:
communicating the first reservation signal or a second reservation signal to reserve a second resource based at least in part on the second resource being different from the first resource; and
communicating the sidelink transmission via the second resource of the sidelink channel based at least in part on reservation of the second resource.

22. The method of claim 18, further comprising:
receiving the sidelink preemption indication that indicates a target UE identifier; and
communicating the first reservation signal to reserve the first resource based at least in part on a UE identifier of the first UE being different from the target UE identifier.

23. The method of claim 18, further comprising:
communicating with the second UE, the first reservation signal to reserve the first resource and a second resource from the set of resources based at least in part on the control signaling; and
communicating with the second UE, the sidelink transmission over the second resource of the sidelink channel based at least in part on the sidelink preemption indication.

24. The method of claim 18, further comprising:
communicating first reservation signals to reserve the first resource and a second resource from the set of resources based at least in part on the control signaling, the first reservation signals comprising the first reservation signal; and
communicating second reservation signals to reserve a third resource and a fourth resource from the set of resources based at least in part on the sidelink preemption indication,
wherein communicating the sidelink transmission is over the third resource and the fourth resource of the sidelink channel.

25. The method of claim 24, wherein the first resource and the second resource are different than the third resource, the fourth resource, or both.

26. The method of claim 18, further comprising:
communicating first reservation signals to reserve the first resource and a second resource from the set of resources during a first transmission time interval based at least in part on the control signaling, the first reservation signals comprising the first reservation signal; and
communicating second reservation signals to reserve the first resource during a second transmission time interval based at least in part on the sidelink preemption indication, wherein communication of the sidelink transmission is over the first resource and the second resource during the second transmission time interval.

27. The method of claim 18, further comprising:
determining that the first resource satisfies a sensing threshold;
determining that the first resource is available for sidelink communication based at least in part on receiving the sidelink preemption indication less than the threshold amount of time prior to the first resource; and
communicating the sidelink transmission via the first resource of the sidelink channel based at least in part on the first resource being available.

28. The method of claim 18, further comprising:
performing a sensing operation to identify that the first resource satisfies a sensing threshold;
identifying that the first resource is available for sidelink communication based at least in part on the sensing operation; and
communicating the sidelink transmission via the first resource of the sidelink channel based at least in part on reserving the first resource.

29. The method of claim 18, further comprising:
receiving, from the second UE, a negative acknowledgement for the sidelink transmission on a sidelink feedback channel based at least in part on the sidelink preemption indication.

30. The method of claim 18, wherein the sidelink preemption indication indicates at least one of a priority, a power threshold, a resource pool identifier, a preemption periodicity, a cast type, or a combination thereof.

* * * * *